(12) United States Patent
Hong et al.

(10) Patent No.: US 12,112,045 B2
(45) Date of Patent: Oct. 8, 2024

(54) STORAGE DEVICE AND METHOD OF OPERATING THE SAME

(71) Applicant: SAMSUNG ELECTRONICS CO., LTD., Suwon-si (KR)

(72) Inventors: Seongwan Hong, Hwaseong-si (KR); Youngmin Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 119 days.

(21) Appl. No.: 17/807,185

(22) Filed: Jun. 16, 2022

(65) Prior Publication Data
US 2023/0138586 A1 May 4, 2023

(30) Foreign Application Priority Data

Oct. 28, 2021 (KR) ........................ 10-2021-0145416

(51) Int. Cl.
*G06F 3/06* (2006.01)
*G06F 1/32* (2019.01)

(52) U.S. Cl.
CPC .............. *G06F 3/0619* (2013.01); *G06F 1/32* (2013.01); *G06F 3/0632* (2013.01); *G06F 3/0656* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 9,075,629 B2 | 7/2015 | Bak et al. | |
| 9,207,869 B2 | 12/2015 | Salomon et al. | |
| 9,495,173 B2 | 11/2016 | Bar-Or et al. | |
| 9,934,047 B2 | 4/2018 | Siddiqi et al. | |
| 10,108,820 B2 | 10/2018 | Yang et al. | |
| 10,635,317 B2 | 4/2020 | Kim et al. | |
| 10,795,605 B2 | 10/2020 | Markow et al. | |
| 11,586,266 B1* | 2/2023 | Abali | G06F 12/0868 |
| 2002/0116651 A1* | 8/2002 | Beckert | G06F 1/3225 |
| | | | 711/159 |
| 2013/0120925 A1* | 5/2013 | Park | G06F 12/0238 |
| | | | 711/E12.007 |

(Continued)

*Primary Examiner* — Kaushikkumar M Patel
(74) *Attorney, Agent, or Firm* — F. Chau & Associates, LLC

(57) ABSTRACT

A storage device includes a nonvolatile memory device and a storage controller. The storage controller includes a buffer memory, a first volatile memory, a second volatile memory, a processor and a buffer context backup circuit. The buffer memory temporarily stores read data and write data. The first and second volatile memories are included in different power domains. The processor generates buffer allocation information, stores the buffer allocation information in the first volatile memory, and controls an access to the buffer memory based on the buffer allocation information. The buffer context backup circuit performs a context backup operation to back up the buffer allocation information from the first volatile memory to the second volatile memory when entering a power down mode and performs a context restoring operation to restore the buffer allocation information from the second volatile memory to the first volatile memory when exiting from the power down mode.

20 Claims, 18 Drawing Sheets

(56) References Cited

U.S. PATENT DOCUMENTS

| | | | |
|---|---|---|---|
| 2013/0166866 A1* | 6/2013 | Yerushalmi | G06F 1/3275 |
| | | | 711/E12.001 |
| 2016/0306579 A1* | 10/2016 | Lee | G06F 3/0634 |
| 2018/0150242 A1* | 5/2018 | Yi | G06F 3/0656 |
| 2018/0329818 A1* | 11/2018 | Cheng | G06F 11/1438 |
| 2019/0227738 A1* | 7/2019 | Youn | G06F 12/0246 |
| 2020/0117389 A1* | 4/2020 | Kang | G06F 3/0679 |
| 2020/0174865 A1 | 6/2020 | Kim | |
| 2021/0004176 A1 | 1/2021 | Seo | |
| 2021/0056022 A1 | 2/2021 | Golov | |
| 2021/0056023 A1* | 2/2021 | Jin | G06F 3/0679 |
| 2023/0035810 A1* | 2/2023 | Lin | H04L 69/14 |

\* cited by examiner

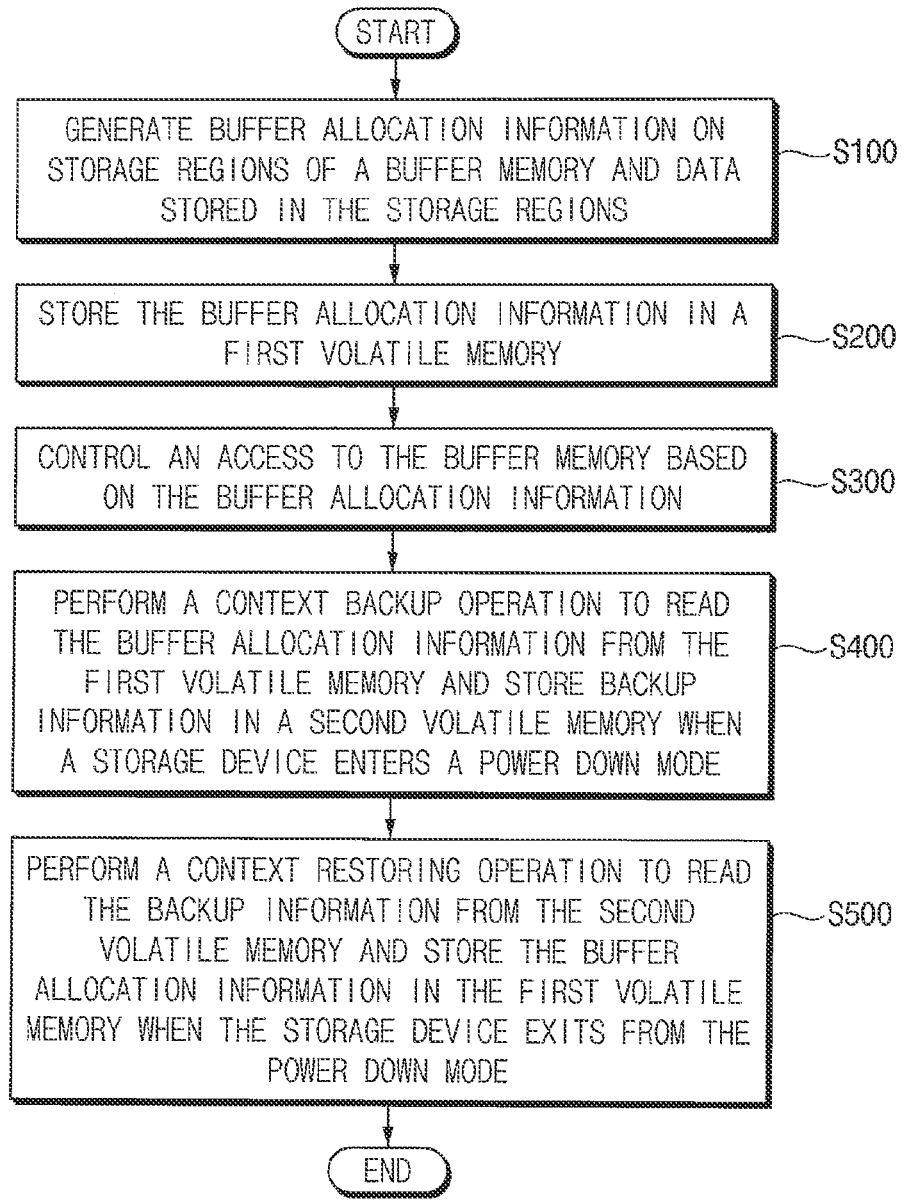

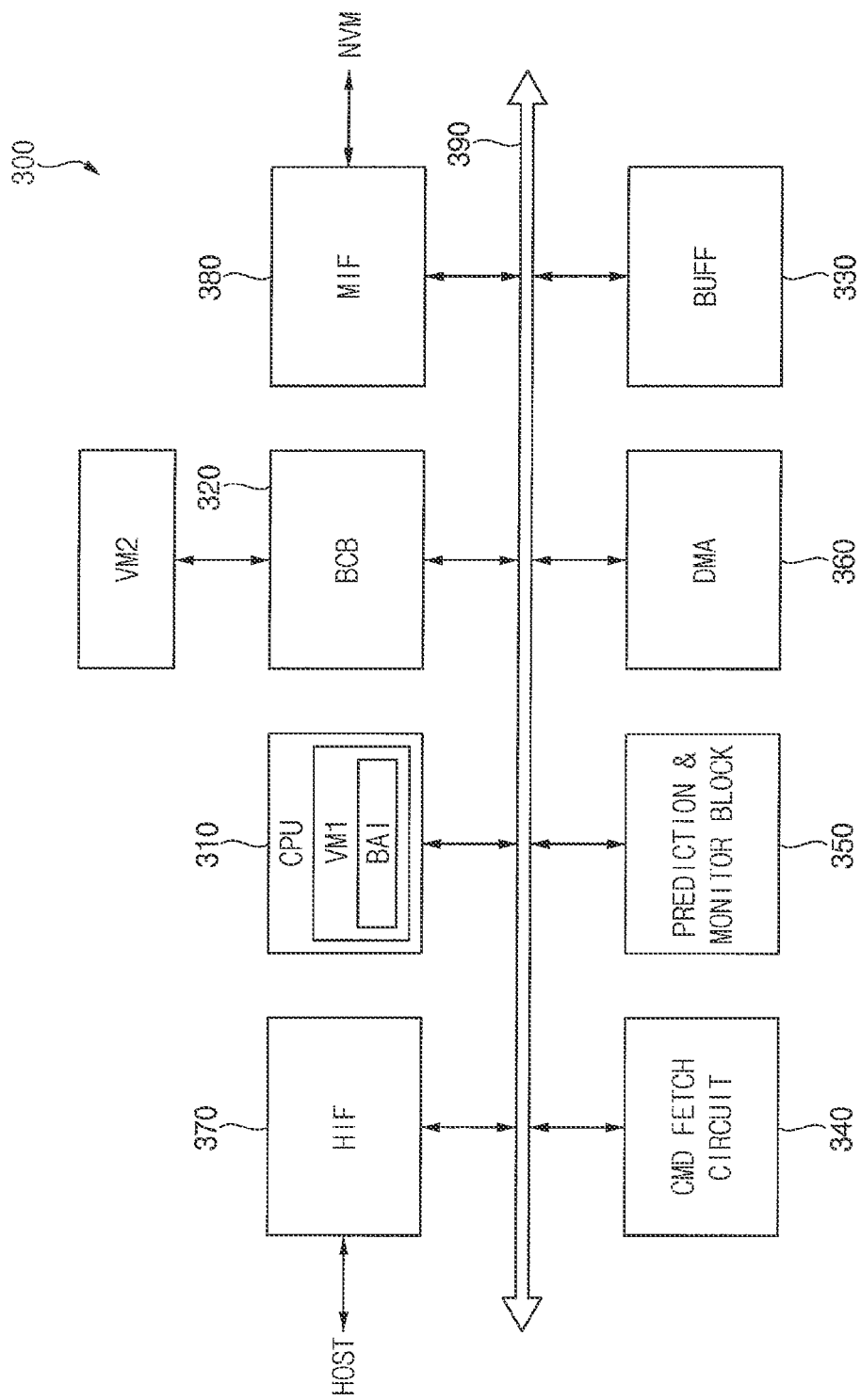

FIG. 4B

| STI | | | | | | | | | | | |
|---|---|---|---|---|---|---|---|---|---|---|---|
| CH12 | CH11 | CH10 | CH9 | CH8 | CH7 | CH6 | CH5 | CH4 | CH3 | CH2 | CH1 |
| V | V | V | V | V | I | I | I | V | I | I | V |

STORAGE DEVICE AND METHOD OF OPERATING THE SAME

CROSS-REFERENCE

This U.S. non-provisional application claims priority under 35 U.S.C. § 119 to Korean Patent Application No. 10-2021-0145416, filed on Oct. 28, 2021, in the Korean Intellectual Property Office (KIPO), the disclosure of which is incorporated by reference herein in its entirety.

FIELD

The present disclosure generally relates to semiconductor integrated circuits, and more particularly relates to a storage device and a method of operating a storage device for efficient conversion of a power mode.

DISCUSSION

One or more semiconductor memory devices may be used in storage devices such as in universal flash storage (UFS) devices, solid state drive (SSD) devices, or the like. These types of storage devices may have various design and/or performance differences versus hard disk drives (HDDs). For example, such data storage devices need not have any moving mechanical parts, and may have higher data access speeds, improved stability, improved durability, and/or reduced power consumption. Various systems such as a laptop computer, a car, an airplane, a drone, or the like, have adopted such storage devices. Various schemes of managing a power mode of the storage devices may be applied to reduce power consumption of the storage devices.

SUMMARY

Some embodiments of the present disclosure may provide a storage device and a method of operating a storage device, capable of efficiently implementing a power down mode of the storage device.

According to an embodiment, a storage device includes a nonvolatile memory device and a storage controller configured to control operations of the nonvolatile memory device. The storage controller includes a buffer memory, a first volatile memory, a second volatile memory, a processor and a buffer context backup circuit. The buffer memory temporarily stores read data read from the nonvolatile memory device and write data to be written in the nonvolatile memory device. The first volatile memory and the second volatile memory are included in different power domains. The processor generates buffer allocation information on storage regions of the buffer memory and data stored in the storage regions, stores the buffer allocation information in the first volatile memory, and controls an access to the buffer memory based on the buffer allocation information. The buffer context backup circuit performs a context backup operation to read the buffer allocation information from the first volatile memory and store backup information in the second volatile memory when the storage device enters a power down mode, and performs a context restoring operation to read the backup information from the second volatile memory and store the buffer allocation information in the first volatile memory when the storage device exits from the power down mode.

According to an embodiment, a storage device includes a nonvolatile memory device and a storage controller configured to control operations of the nonvolatile memory device. The storage controller includes a buffer memory configured to temporarily store read data read from the nonvolatile memory device and write data to be written in the nonvolatile memory device, a first volatile memory included in a power off domain such that power supplied to the power off domain is blocked during a power down mode, a second volatile memory included in a power on domain such that power is supplied to the power on domain during the power down mode, a processor configured to generate buffer allocation information on storage regions of the buffer memory and data stored in the storage regions, store the buffer allocation information in the first volatile memory, and control an access to the buffer memory based on the buffer allocation information, and a buffer context backup circuit configured to perform a context backup operation to read the buffer allocation information from the first volatile memory, compress the buffer allocation information and store backup information in the second volatile memory when the storage device enters the power down mode, and to perform a context restoring operation to read the backup information from the second volatile memory, decompress the backup information and store the buffer allocation information in the first volatile memory when the storage device exits from the power down mode.

According to an embodiment, a method of operating a storage device, includes, generating buffer allocation information on storage regions of a buffer memory and data stored in the storage regions, storing the buffer allocation information in a first volatile memory, controlling an access to the buffer memory based on the buffer allocation information, performing a context backup operation to read the buffer allocation information from the first volatile memory and store backup information in a second volatile memory when the storage device enter a power down mode and performing a context restoring operation to read the backup information from the second volatile memory and store the buffer allocation information in the first volatile memory when the storage device exits from the power down mode.

Some embodiments of the storage device and the method may reduce the power down exit time and enhance the performance of the storage device by omitting a process of reconstructing the buffer allocation information that is required while exiting from the power down mode.

Some embodiments of the storage device and the method may enhance the performance of the storage device with reduction of the size of the second volatile memory and the static power consumption of the power on domain by compressing the buffer allocation information to back up the compressed information in the second volatile memory during the power down mode.

BRIEF DESCRIPTION OF THE DRAWINGS

Embodiments of the present disclosure will be more clearly understood from the following detailed description taken in conjunction with the accompanying drawings.

FIG. 2 is a flowchart diagram illustrating a method of operating a storage device according to an embodiment;

FIG. 3 is a block diagram illustrating an embodiment of a storage controller included in a storage device according to an embodiment;

FIGS. 4A and 4B are block diagrams illustrating an embodiment of information stored in a volatile memory included in a storage device according to an embodiment;

DETAILED DESCRIPTION

Figure 1:
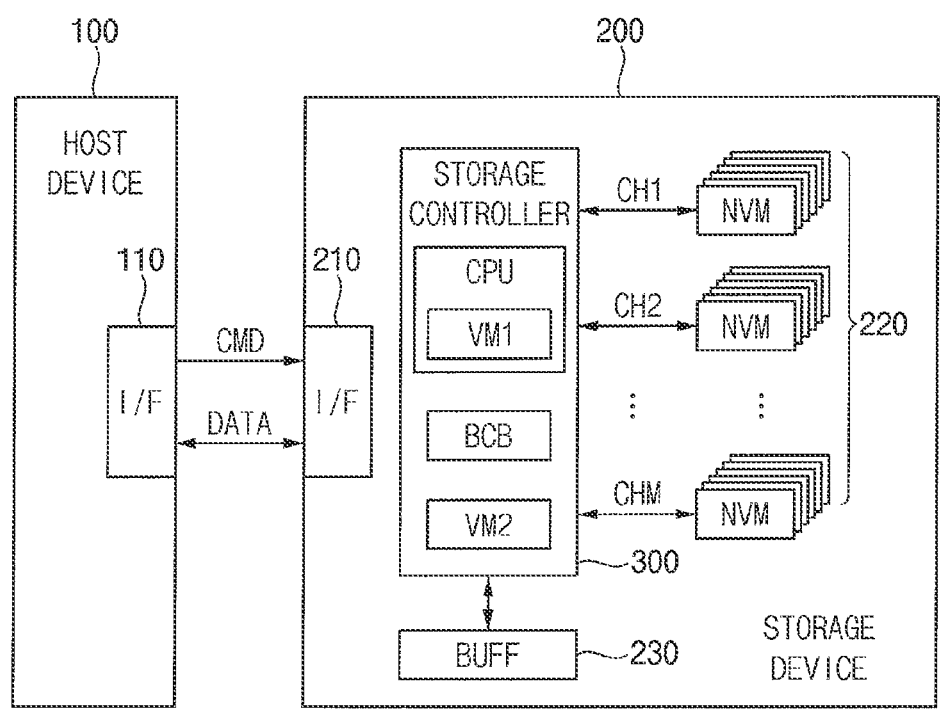
FIG. 1 is a block diagram illustrating a system including a storage device according to an embodiment.

Various embodiments of the present disclosure will be described more fully hereinafter by way of example with reference to the accompanying drawings, in which some embodiments are shown. In the drawings, like reference indicia may refer to like elements throughout, and substantially redundant description may be omitted.

FIG. 1 illustrates a system including a storage device according to an embodiment, and FIG. 2 illustrates a method of operating a storage device according to an embodiment.

Referring to FIG. 1, a system 10 may include a host device 100 and a storage device 200. The storage device 200 may be a universal flash storage (UFS) device. However, embodiments are not limited thereto, and the storage device 200 may be implemented as various types of devices such as solid-state drive (SSD), an embedded multimedia card (eMMC), a compact flash (CF) card, a secure digital (SD) card, a micro secure digital (Micro-SD) card, a mini secure digital (Mini-SD) card, an extreme digital (xD) card, a memory stick, or the like.

The storage device 200 may communicate with the host device 100 via various interfaces. In some embodiments, the host device 100 and the storage device 200 may communicate with each other based on a USF interface specified by the Joint Electron Device Engineering Council (JEDEC). The host device 100 and the storage device 200 may exchange packets having a format of a UFS protocol information unit (UPIU) that includes various information defined by the UFS interface, but embodiments are not limited thereto. In some embodiments, for communication between the storage device 200 and the host device 100, various interfaces such as an advanced technology attachment (ATA) interface, a serial ATA (SATA) interface, an external SATA (e-SATA) interface, a small computer small interface (SCSI), a serial attached SCSI (SAS) interface, a peripheral component interconnection (PCI) interface, a PCI express (PCI-E) interface, an IEEE 1394 interface, a universal serial bus (USB) interface, a secure digital (SD) card interface, a multimedia card (MMC) interface, an embedded multimedia card (eMMC) interface, and/or a compact flash (CF) card interface may be used.

The host device 100 may request a data processing operation, such as a data read operation or a data write operation, of the storage device 200. In some embodiments, the host device 100 may be a central processing unit (CPU), a processor, a microprocessor, an application processor (AP), or the like. According to an embodiment, the host device 100 may be implemented as a system-on-a-chip (SoC).

An interface circuit (I/F) 110 in the host device 100 may include various physical components such as a transmitter, a receiver, or the like to communicate with the storage device 200.

The storage device 200 may include a nonvolatile memory (NVM) 220 including a plurality of nonvolatile memory cells. In an embodiment, the nonvolatile memory 220 may include a plurality of flash memory cells. For example, the flash memory cells may be NAND flash memory cells as may be described below with reference to FIGS. 17 through 19. However, embodiments are not limited thereto, and the memory cells may be resistive memory cells such as resistive random-access memory (ReRAM) cells, phase-change RAM (PRAM) cells, or magnetic RAM (MRAM) cells.

The storage device 200 may further include a storage controller 300 for controlling memory operations of the nonvolatile memory 220, such as data write or read operations. The storage device 200 may further include a buffer memory BUFF 230 for temporarily storing data in the data write and read operations. For example, the buffer memory 230 may be implemented as a volatile memory such as dynamic RAM (DRAM) or static RAM (SRAM). The buffer memory 230 may include a write data buffer for temporarily storing write data to be written in the nonvolatile memory device 220, and a read data buffer for temporarily storing read data read from the nonvolatile memory device 220. Optionally, the buffer memory 230 may be included in the storage controller 300.

An interface circuit 210 in the storage device 200 may include various physical components such as a transmitter, a receiver, or the like to communicate with the host device 100. The storage controller 300 may control and manage overall operations of the storage device 200. For example, the storage controller 300 may process signals or data exchanged with the host device 100 through the interface circuit 210. In some embodiments, the interface circuit 210 may be included in the storage controller 300.

The storage controller 300 may control the memory operations of the nonvolatile memory 220 via one or more channels. For example, the storage controller 300 may be connected to the nonvolatile memory 220 via the M channels CH1 to CHM, and write or read data in or from the nonvolatile memory 220. For example, the storage controller 300 may control the nonvolatile memory 220 connected to different channels, in parallel.

In some embodiments, the nonvolatile memory 220 may include a plurality of memory chips. The nonvolatile memory 220 may include one or more memory chips corresponding to each of the M channels CH1 to CHM. Based on commands or requests from the host device 100, the storage controller 300 may queue the commands for the M channels CH1 to CHM and transmit or receive data based on the commands to or from the nonvolatile memory 220 via the M channels CH1 to CHM.

The storage controller 300 may include a processor CPU, a first volatile memory VM1, a second volatile memory VM2 and a buffer context backup circuit BCB. The first volatile memory VM1 may be included in the processor CPU as illustrated in FIG. 1, or the first volatile memory VM1 may be disposed outside the processor CPU. FIG. 1 illustrates only one of several possible configurations of the components for describing an embodiment, and further detailed configuration of the storage controller 300 may be described below with reference to FIG. 3.

According to an embodiment, the first volatile memory VM1 and/or the second volatile memory VM2 may be implemented with dynamic RAM (DRAM) or static RAM (SRAM). In particular, the second volatile memory VM2 may be implemented with SRAM that need not perform a dynamic refresh of stored data.

The first volatile memory VM1 and the second volatile memory VM2 may be included in different power domains. In some embodiments, the buffer memory 230, the first volatile memory VM1 and the processor CPU may be included in a power off domain such that power supplied to the power off domain is blocked during a power down mode. In contrast, the second volatile memory VM2 may be included in a power on domain such that power is supplied to the power on domain during the power down mode. In addition, the nonvolatile memory 220 may be included in the power on domain, without limitation thereto.

Referring to FIGS. 1 and 2, the processor CPU may generate buffer allocation information on storage regions of the buffer memory 230 and data stored in the storage regions (S100). The processor CPU may store the buffer allocation information in the first volatile memory VM1 (S200), and control an access to the buffer memory 230 based on the buffer allocation information (S300).

The buffer context backup circuit BCB may perform a context backup operation to read the buffer allocation information from the first volatile memory VM1 and store backup information in the second volatile memory VM2 when the storage device enters a power down mode (S400). In addition, the buffer context backup circuit BCB may perform a context restoring operation to read the backup information from the second volatile memory VM2 and store the buffer allocation information in the first volatile memory VM1 when the storage device exits from the power down mode (S500).

As such, the storage device 200 and the method according to an embodiment may reduce the power down exit time and enhance the performance of the storage device 200 by omitting a process of reconstructing the buffer allocation information that is required while exiting from the power down mode. In addition, the storage device 200 and the method according to an embodiment may enhance the performance of the storage device 200 with reduction of the size of the second volatile memory VM2 and the static power consumption of the power on domain by compressing the buffer allocation information to back up the compressed information in the second volatile memory during the power down mode.

FIG. 3 illustrates an embodiment of a storage controller included in a storage device according to an embodiment. The storage controller 300 may be an element included in a storage device such as an SSD or a memory card, and may be connected to a nonvolatile memory device NVM via a plurality of channels to control memory operations.

Referring to FIG. 3, the storage controller 300 may include a processor 310 such as a central processing unit (CPU), a buffer context backup circuit BCB 320, a buffer memory BUFF 330, a command (CMD) fetch circuit 340, a prediction and monitor block 350, a direct memory access (DMA) manager 360, a host interface HIF 370, a memory interface MIF 380 and a system bus 390. Although a single processor 310 is illustrated in FIG. 3, the storage controller 300 may include a plurality of processors. The first volatile memory VM1 may store various types of information, such as the buffer allocation information BAI and the status information as will be described below with reference to FIGS. 4A and 4B.

The storage controller 300 may communicate with a host device via the host interface 370. For example, the command fetch circuit 340 may fetch commands from the host device. In addition, the storage controller 300 may communicate with the nonvolatile memory device NVM via the memory interface 380. For example, write data and read data may be exchanged between the storage controller 300 and the nonvolatile memory device NVM via the memory interface 380. The write data from the host device may be temporarily stored in the buffer memory 330 and then provided to the nonvolatile memory device NVM, and the read data read from the nonvolatile memory device NVM may be temporarily stored in the buffer memory 330 and then provided to the host device.

The prediction and monitor block 350 may perform prediction and monitoring operations regarding the fetched commands. For example, the prediction and monitor block 350 may predict channels to be mapped to the fetched commands, among a plurality of channels connected to the nonvolatile memory device NVM. The channels mapped to the commands may refer to channels connected to a nonvolatile memory device corresponding to physical addresses converted from logical addresses included in the commands.

In addition, the prediction and monitor block 350 may monitor statuses of the channels by checking the status information stored in the first volatile memory VM1. For example, when commands are fetched, the status information corresponding to channel information indicating the channels mapped to the commands may be read, and the fetched commands, and the channel information and the status information corresponding thereto may be stored to be accessible by the processor 310. For example, the fetched commands may be stored in the first volatile memory VM1 in the form of descriptors (e.g., command descriptors CMD DESC) analyzable by the processor 310. The channel information and the status information corresponding to the fetched commands may be included in and stored together with the command descriptors.

DMA descriptors (DMA DESC) including information about currently allocable storage spaces among a plurality of storage spaces in the buffer memory 330 may be further stored in the first volatile memory VM1. For example, the DMA descriptors may include information about addresses of validly allocable storage spaces of the buffer memory 330. The buffer memory 330 may be allocated for the commands with reference to the DMA descriptors.

Although the prediction and monitor block 350 is illustrated as a single functional block in FIG. 3, embodiments are not limited thereto, and a circuit for performing prediction and a circuit for performing monitoring may be separately provided. The prediction and monitor block 350 in FIG. 3 may be implemented as hardware including, for example, a circuit. Alternatively, the prediction and monitor block 350 may be implemented as software including a plurality of programs, and stored in the storage controller 300 (e.g., in the first volatile memory VM1). Otherwise, the prediction and monitor block 350 may be implemented as a combination of hardware and software. Although the buffer memory 330 is included in the storage controller 300 in FIG. 3, the buffer memory 330 may be disposed outside the storage controller 300 as described above with reference to FIG. 1.

The DMA manager 360 may control direct memory access operations regarding the write data and the read data. For example, the DMA manager 360 may control operations of storing the write data from the host device, in the buffer memory 330, and reading the write data from the buffer memory 330 to provide the same to the nonvolatile memory device NVM. In addition, the DMA manager 360 may control operations of storing the read data from the nonvolatile memory device NVM, in the buffer memory 330, and reading the read data stored in the buffer memory 330 to provide the same to the host device.

An operation of the storage controller 300 illustrated in FIG. 3 is now described in detail. A plurality of commands may be fetched from the host device, and the prediction and monitor block 350 may predict channels mapped to the fetched commands. For the prediction operation, channel striping may be performed to evenly assign the commands to the channels. The channel striping operation may be performed using various schemes. For example, a plurality of channels may be sequentially mapped based on a command fetched order, or a channel may be mapped to each command through calculation using a logical address included in the command.

It is assumed that the storage controller 300 sequentially fetches first to N-th commands, and that the channel information and the status information corresponding to the fetched first to N-th commands are stored in the first volatile memory VM1.

To process the first to N-th commands, the processor 310 may control buffer allocation by using various types of information stored in the first volatile memory VM1. For example, the status information corresponding to the earliest fetched first command may be checked. When the status information is set to a first value or a second value based on a workload of each channel, it may be determined whether allocation of the buffer memory 330 for the first command is appropriate, by checking the status information.

If a channel mapped to the first command has a large workload and thus the status information of the channel has the first value, it may be determined that allocation of the buffer memory 330 for the first command is not appropriate. Otherwise, if a channel mapped to the first command has a small workload and thus the status information of the channel has the second value, it may be determined that allocation of the buffer memory 330 for the first command is appropriate.

Similar to the above-described first command, the status information of a channel mapped to each of the second to N-th commands may be checked. Based on the result of checking, commands corresponding to the status information having the first value and commands corresponding to the status information having the second value may be determined.

The processor 310 may select commands for which the buffer memory 330 is allocated, based on the result of checking the status information. For example, if the status information corresponding to the first command has the first value, allocation of the buffer memory 330 for the first command may be deferred. Otherwise, if the status information corresponding to the second command has the second value, the buffer memory 330 may be preferentially allocated for the second command compared to the first command. According to an embodiment, the buffer memory 330 may be preferentially allocated for one or more of the first to N-th commands corresponding to the status information having the second value, and then allocated for the other commands corresponding to the status information having the first value.

That is, the processor 310 preferentially allocates the buffer memory 330 for a command having an early processing timing or an early processing completion timing, irrespectively of a command fetched order. As such, a lifetime for which allocation of the buffer memory 330 is maintained may be reduced and thus usability of the buffer memory 330 may be improved. When usability of the buffer memory 330 is improved, the size of the buffer memory 330 may be reduced.

As illustrated in FIG. 3, the first volatile memory VM1 may be included in the processor or the first volatile memory VM1 may be a tightly coupled memory that is directly connected to the processor 310 without passing through the system bus 390 of the storage device. The second volatile memory VM2 may be directly connected to the buffer context backup circuit 320 without passing through the system bus 390.

As described above, the buffer context backup circuit 320 may perform a context backup operation to read the buffer allocation information from the first volatile memory VM1 and store backup information in the second volatile memory VM2 when the storage device enter a power down mode. In addition, the buffer context backup circuit 320 may perform a context restoring operation to read the backup information from the second volatile memory VM2 and store the buffer allocation information in the first volatile memory VM1 when the storage device exits from the power down mode.

Figure 4A:
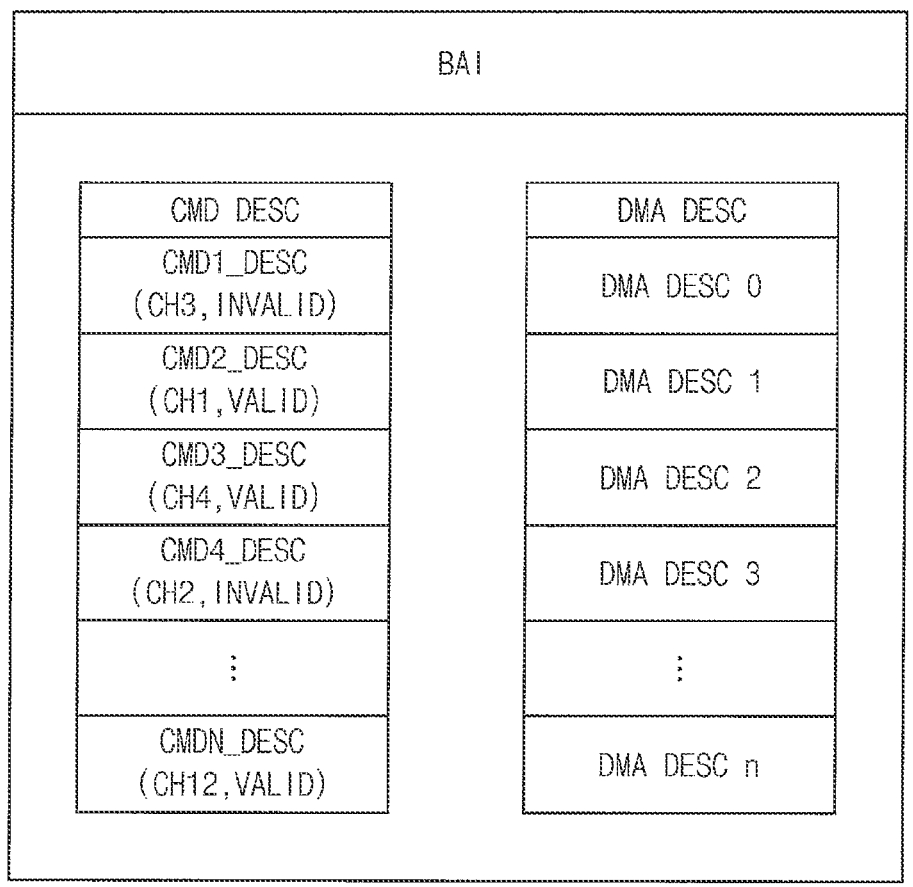

FIGS. 4A and 4B illustrate an embodiment of information stored in a volatile memory included in a storage device according to an embodiment. FIG. 4A illustrates an embodiment of the buffer allocation information BAI and FIG. 4B illustrates an embodiment of the status information STI.

Referring to FIGS. 3 and 4A, when the command descriptors of the fetched commands are stored in the first volatile memory VM, the channel information and the status information corresponding to the commands may also be stored therein based on the above-described prediction and monitoring operation. For example, assuming that the storage controller 300 is connected to the nonvolatile memory device NVM via twelve channels and that N commands CMD1 to CMDN are fetched or received from the host device, the command descriptors of the N commands CMD1 to CMDN, and the channel information and the status information corresponding to the N commands CMD1 to CMDN are stored in the first volatile memory VM1. According to the afore-described embodiment, the status information corresponding to each channel may have a first value I (invalid) or a second value V (valid). FIG. 4A shows an example in which the status information corresponding to a third channel CH3 mapped to the first command CMD1 has the first value I (invalid), and the status information corresponding to a first channel CH1 mapped to the second command CMD2 has the second value V (valid).

In addition, the DMA descriptors include information about storage spaces of the buffer memory 330 in which write data or read data is to be temporarily stored, which may be stored in the first volatile memory VM1. For example, the buffer memory 330 may include n storage spaces (where n is an integer equal to or greater than 2), and the DMA descriptors may include address information of each storage space or information indicating whether each storage space is validly allocable for a command.

Referring to FIG. 4B, the status information STI per channel may be stored in the form of a table in the first volatile memory VM1. For example, the status information STI generated by determining a workload of each of twelve channels CH1 to CH12 may be stored, and a first value I (invalid) or a second value V (valid) may be stored to correspond to each channel. The status information STI shown in FIG. 4B may be read or monitored by the prediction and monitor block 350 according to the afore-described embodiment.

The status information may be generated using various schemes. For example, the memory interface 380 may include command queues for queuing commands mapped to the channels CH1 to CH12, and a scheduler for scheduling execution of the commands stored in the command queues. The scheduler may determine a workload per channel based on the commands stored in the command queues corresponding to the channels CH1 to CH12, and generate and store the status information per channel in the first volatile memory based on the result of determination. For example, the scheduler may determine the workload per channel based on at least one of the number of unexecuted commands, the types of commands, and information indicating whether a background operation is performed.

Although the workload is determined using hardware by the scheduler in the above description, embodiments are not limited thereto. For example, the operations of determining the workload per channel and generating the status information may be performed using software or using a combination of hardware and software.

As such, the storage controller 300 may be connected to the nonvolatile memory device NVM through a plurality of channels and the storage controller 300 may generate the status information STI per channel based on respective workloads of the plurality of channels and store the status information STI in the first volatile memory VM1.

Figure 5:
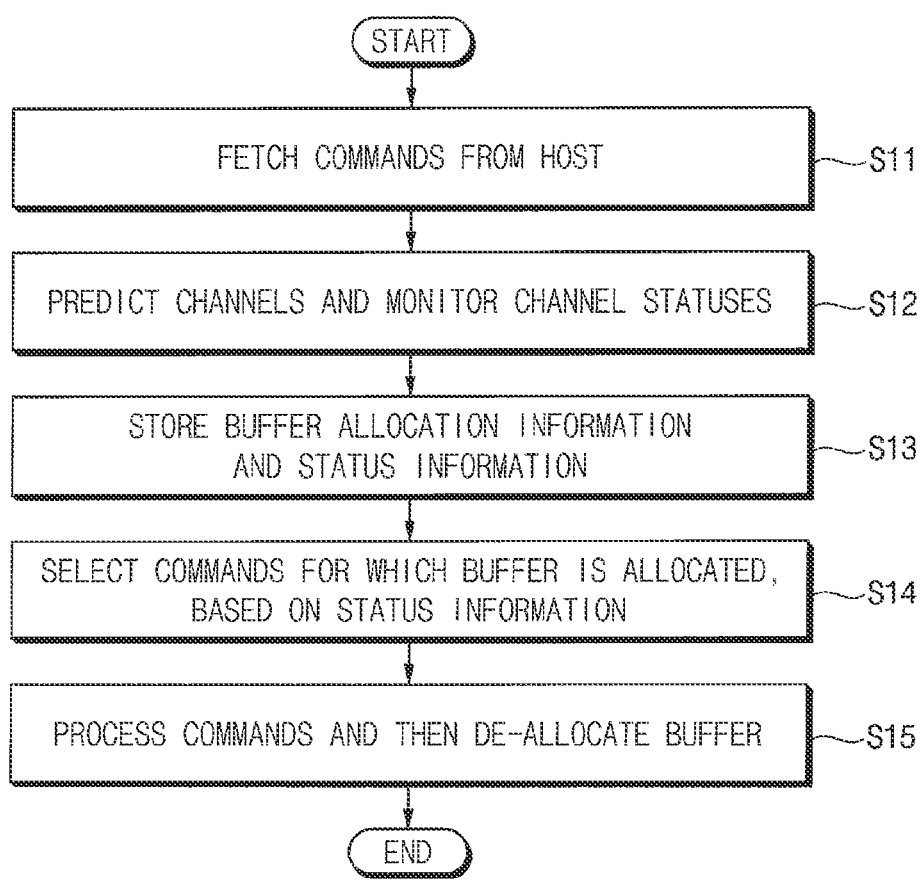
FIG. 5 is a flowchart diagram illustrating a method of operating a storage device according to an embodiment.
Figure 6:
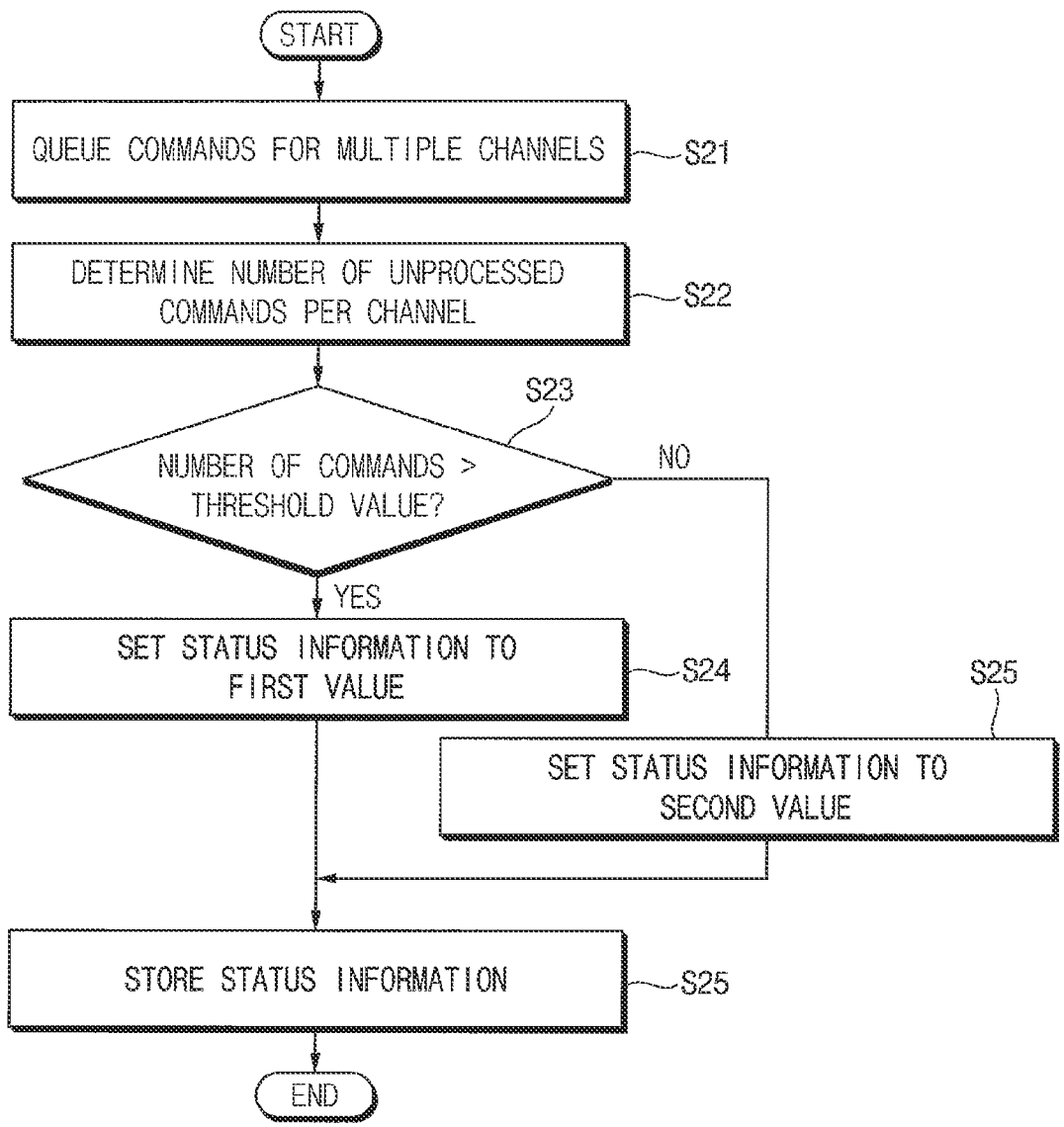
FIG. 6 is a flowchart diagram illustrating a method of operating a storage device according to an embodiment.
Figure 7:
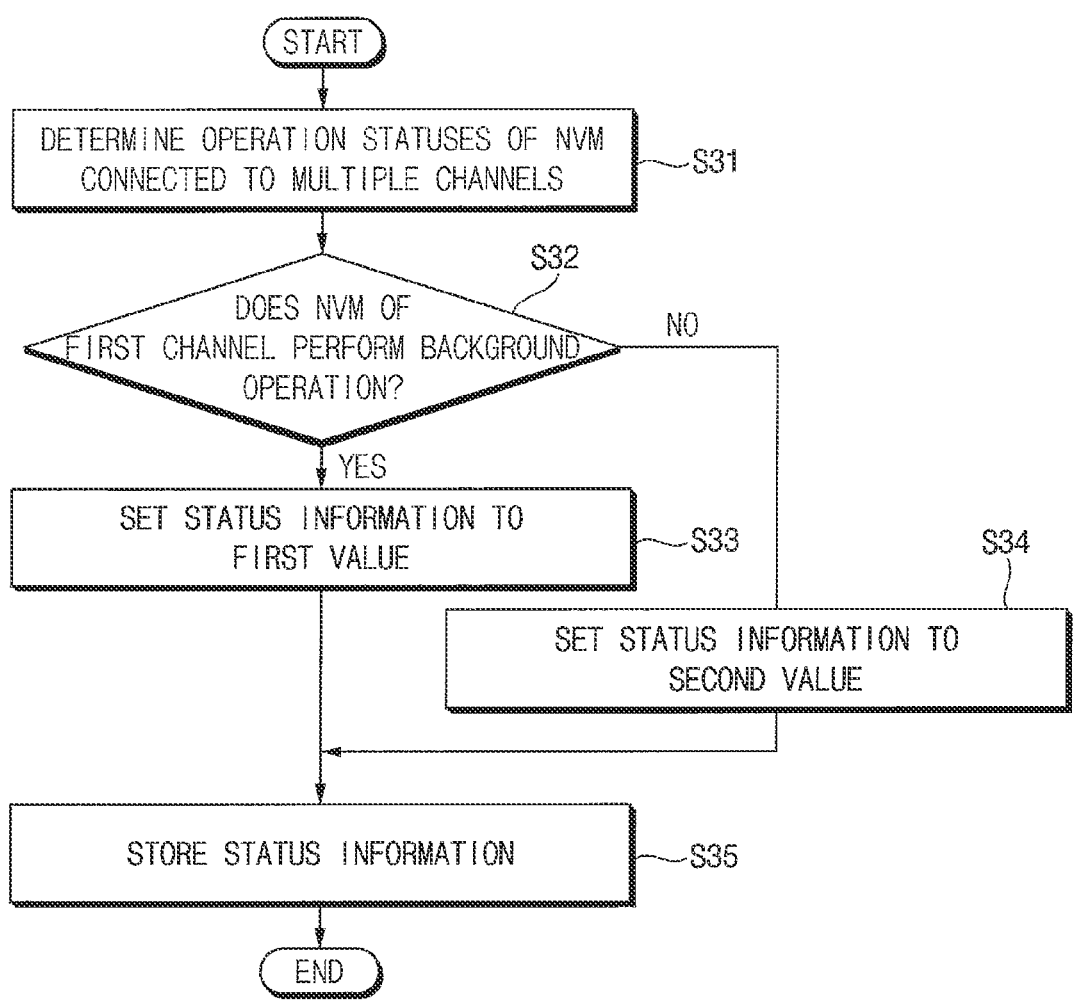
FIG. 7 is a flowchart diagram illustrating a method of operating a storage device according to an embodiment.

FIGS. 5, 6 and 7 illustrate methods of operating a storage device according to embodiments.

Referring to FIG. 5, a storage device may fetch or receive one or more commands from a host (S11). The fetched commands may be stored in a memory (e.g., the first volatile memory VM1) in the form of command descriptors to be analyzable by a processor.

Channels may be predicted for the fetched commands, and may be mapped to the commands based on the result of prediction. Statuses of the predicted channels may be monitored (S12). For example, the statuses of the channels may be monitored by accessing a memory for storing status information of a plurality of channels according to the afore-described embodiments. According to an embodiment, information indicating whether allocation of the buffer memory for the commands mapped to each channel is appropriate may be stored as the status information.

Based on the results of prediction and monitoring, the buffer allocation information including channel information and the status information corresponding to the one or more fetched commands may be stored (S13), and the command descriptors, the channel information, and the status information may be analyzed by the processor. Commands for which the buffer memory is allocated may be selected based on the status information under the control of the processor (S14). For example, the buffer memory need not be allocated for the commands based on a command fetched order, but may be arbitrarily allocated for the commands based on the stored status information. The commands for which the buffer memory is allocated may be processed, and the buffer memory may be de-allocated after a data write or read operation is completed (S15).

FIG. 6 shows an example of generating and storing status information.

Referring to FIG. 6, a storage device may include command queues for storing commands mapped to a plurality of channels, and a scheduler for scheduling operations of processing the commands stored in the command queues. The command queues may individually correspond to the channels, and thus command queuing may be performed per channel (S21).

The scheduler may determine workloads of the channels. For example, the scheduler may determine the number of unprocessed commands (or the number of commands remaining in a command queue) per channel (S22). According to an embodiment, the scheduler may determine a workload per channel by checking commands stored in a command queue corresponding to each channel. For example, the scheduler may compare the number of commands to a certain threshold value to determine whether the number of commands is greater than the threshold value (S23).

Based on the result of comparison, status information corresponding to each of the channels may be generated, and the generated status information may be stored in the first volatile memory VM1. For example, if the number of commands mapped to a channel is greater than the threshold value, the status information of the channel may be set to a first value (S24). Otherwise, if the number of commands mapped to a channel is not greater than the threshold value, the status information of the channel may be set to a second value (S25).

The above-described operation of generating the status information based on the workload may be performed per channel, and the status information having the first or second value based on the result of comparison may be stored in the memory (S26).

FIG. 7 shows another example of generating and storing status information.

Referring to FIG. 7, operation statuses of nonvolatile memories connected to a plurality of channels may be determined (S31). For example, a scheduler included in a storage device may schedule various operations of the nonvolatile memories connected to the channels. For example, the scheduler may schedule background operations of the nonvolatile memories. The background operations may include various types of operations. For example, the background operations may include bad block management, garbage collection, data reclaim, and data replacement.

For example, one or more nonvolatile memories may be connected to a first channel, and it may be determined whether at least one nonvolatile memory of the first channel performs a background operation (S32). For example, the determination operation may be performed by determining whether the background operation is currently performed or is scheduled to be performed. Alternatively, the determination operation may be performed by checking commands (e.g., background operation commands) stored in a command queue corresponding to each channel.

Upon determining that at least one nonvolatile memory connected to the first channel is performing the background operation, status information corresponding to the first channel may be set to a first value (S33). Otherwise, upon determining that the nonvolatile memory is not performing the background operation, the status information corresponding to the first channel may be set to a second value (S34). The above-described operation of generating the status information based on whether a background operation is performed may be performed per channel, and the status information having a value set based on the result of determination may be stored in the first volatile memory VM1 (S35).

The operating methods illustrated in FIGS. 6 and 7 show embodiments related to generation of the status information, and embodiments may be variously changed. For example, the workload may be determined based on the types of commands queued per channel. For example, a write operation, a read operation, and an erase operation of a nonvolatile memory may be performed at different speeds, and the status information may be set based on the types of commands queued per channel.

Alternatively, with regard to a background operation, the status information may be set based on whether the background operation is performed, or based on the type of the background operation (e.g., garbage collection or data reclamation).

Figure 8:
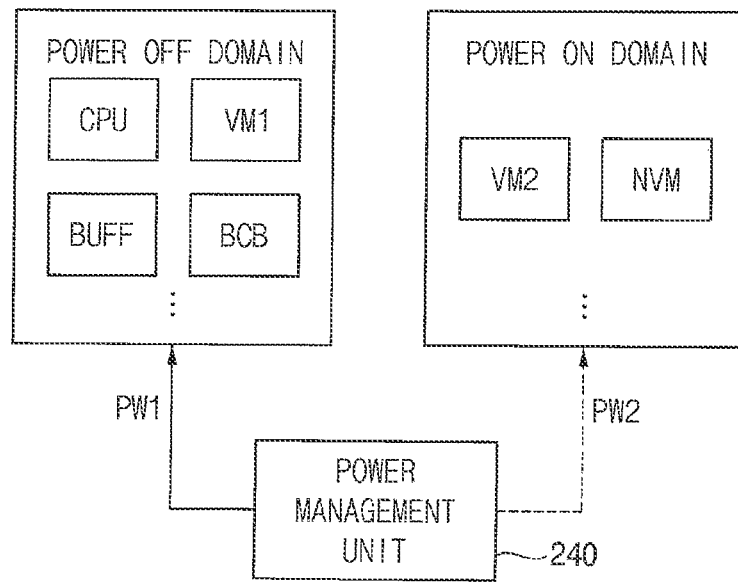
FIG. 8 is a block diagram illustrating power domains of a storage device according to an embodiment.

FIG. 8 illustrates power domains of a storage device according to an embodiment.

Referring to FIG. 8, power domains of a storage device may include a power on domain and a power off domain. The power off domain may include a processor CPU, a first volatile memory VM1, a buffer memory BUFF, a buffer context backup circuit BCB or the like. The power on domain may include a second volatile memory VM2. A nonvolatile memory device NVM may be included in the power on domain as illustrated in FIG. 8, In an alternate embodiment, the nonvolatile memory device NVM may be included in the power off domain.

The storage device may include a power management unit 240 that supply first power PW1 to the power off domain and second power PW2 to the power on domain. The power management unit 240 may respectively control the first power PW1 and the second power PW2 depending on power modes of the storage device. The power management unit 240 may block the first power PW1 from being supplied to the power off domain including the buffer memory, the first volatile memory, the processor and the buffer context backup circuit during the power down mode, and maintain the second power PW2 supplied to the power on domain including at least the second volatile memory during the power down mode.

Figure 9:
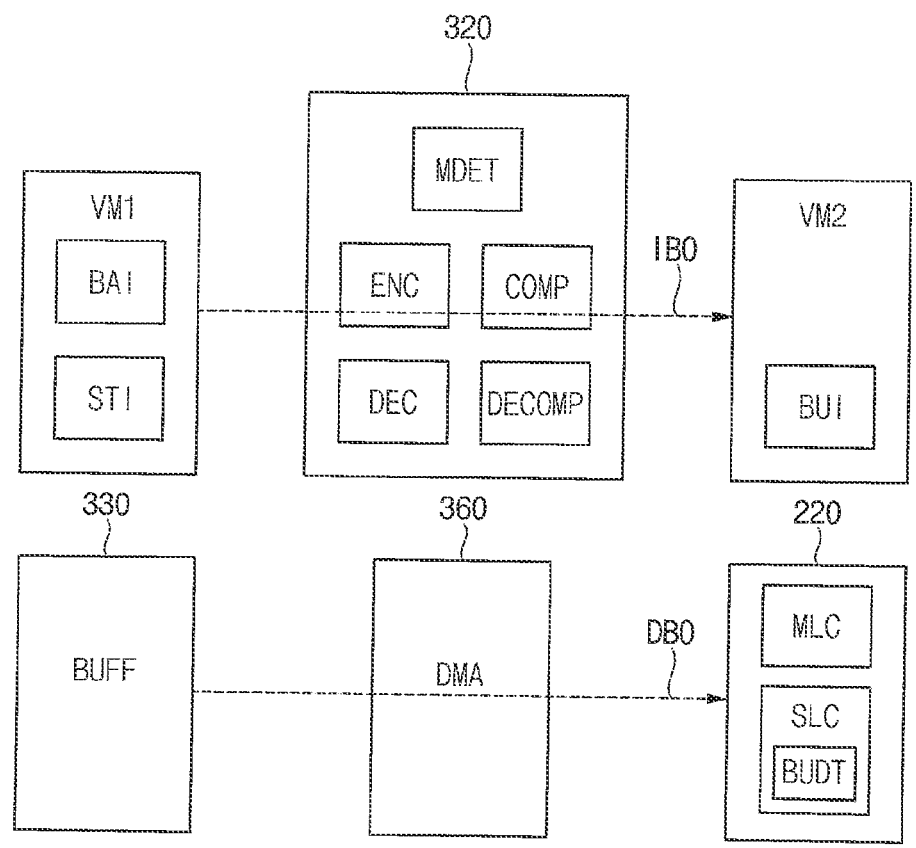
FIG. 9 is a block diagram illustrating a process of entering a power down mode of a storage device according to an embodiment.
Figure 10:
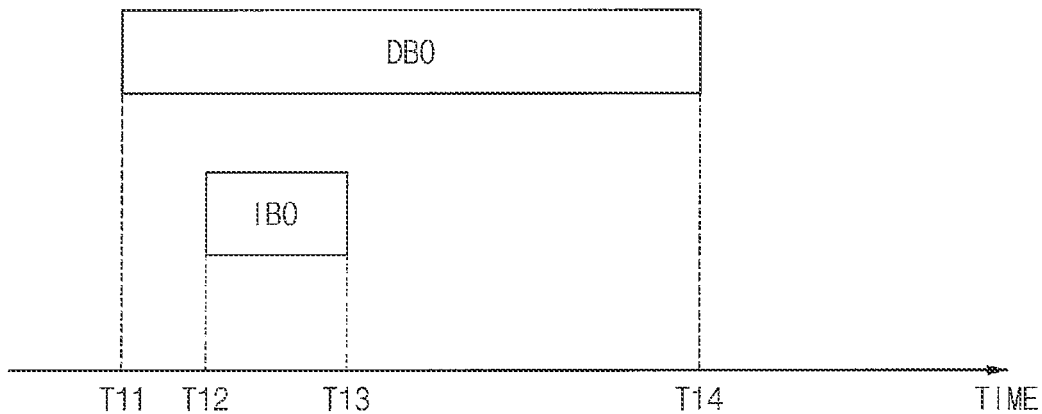
FIG. 10 is a timing diagram illustrating a process of entering a power down mode of a storage device according to an embodiment.
Figure 11:
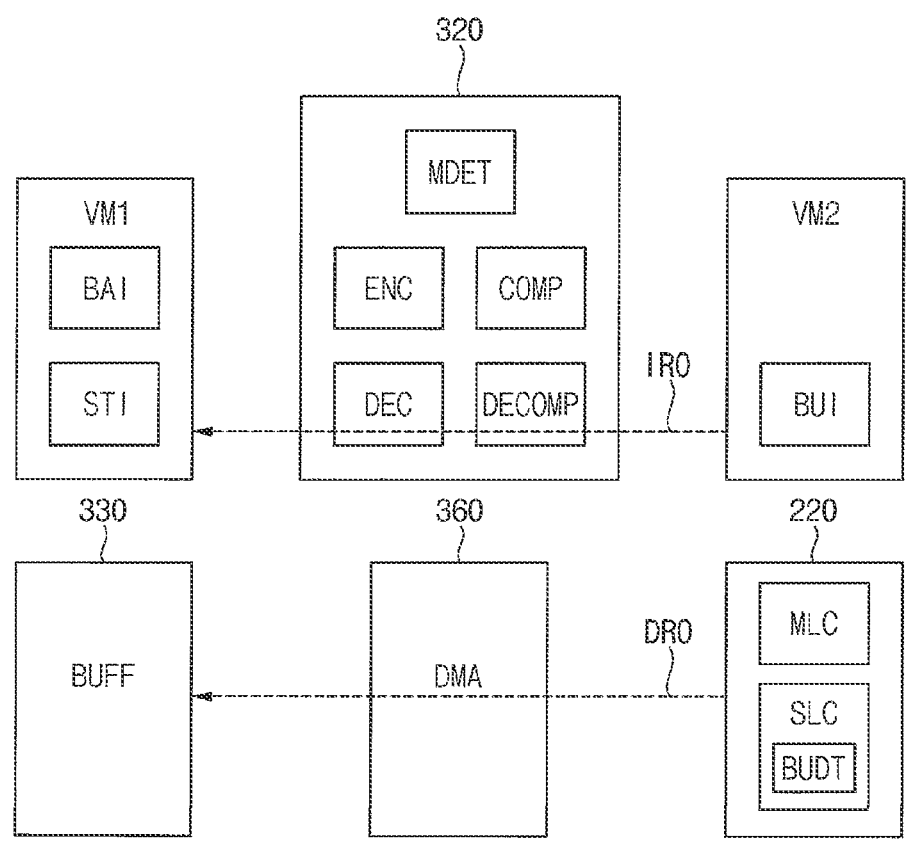
FIG. 11 is a block diagram illustrating a process of exiting from a power down mode of a storage device according to an embodiment.
Figure 12:
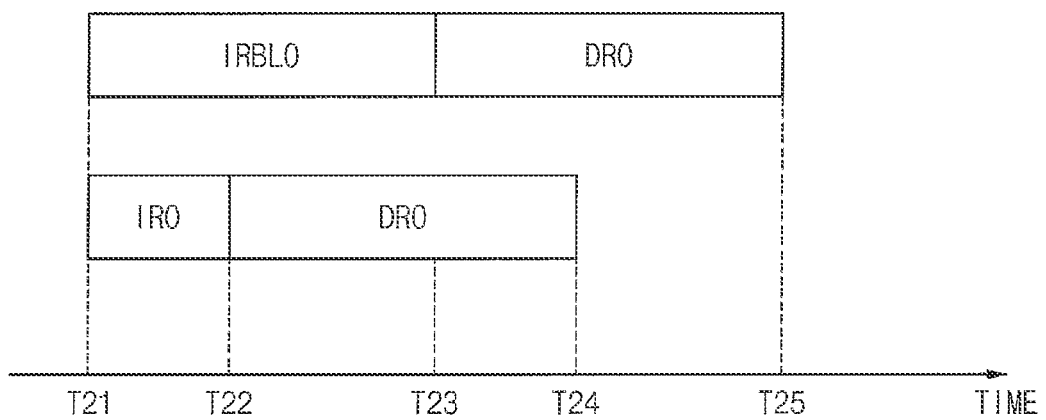
FIG. 12 is a timing diagram illustrating a process of exiting from a power down mode of a storage device according to an embodiment.

FIGS. 9 and 10 illustrate a process of entering a power down mode of a storage device according to an embodiment. FIGS. 11 and 12 illustrate a process of exiting from a power down mode of a storage device according to an embodiment.

Referring to FIGS. 9 and 11, the buffer context backup circuit 320 may include a mode detector MDET, a compressor COMP and a decompressor DECOMP. In some embodiments, the buffer context backup circuit 320 may further include an error correction (ECC) or the like encoder ENC and an ECC or the like decoder DEC.

The mode detector MDET may detect timings of entering and exiting from the power down mode and control the context backup operation IBO and the context restoring operation IRO based on the detection results. In some embodiments, as will be described below with reference to FIG. 15, the mode detector MDET may receive an internal mode signal MD from the power management unit 240. The mode detector MDET may determine timings of starting the context backup operation IBO and the context restoring operation IRO based on the internal mode signal MD.

The data flow when the storage device enters the power down mode is represented by dashed lines with arrows in FIG. 9, and the data flow when the storage device exits from the power down mode is represented by dashed lines with arrows in FIG. 11.

Referring to FIG. 9, when the storage device enters the power down mode, the buffer context backup circuit 320 may perform the context backup operation IBO such that the buffer context backup circuit 320 reads the buffer allocation information BAI from the first volatile memory VM1 to store the backup information BUI, based on or including the BAI, in the second volatile memory VM2. In some embodiments, the buffer context backup circuit 320 may read the status information STI in addition to the buffer allocation information BAI from the first volatile memory VM1 to store the backup information BUI, based on or including both of the buffer allocation information BAI and the status information STI, in the second volatile memory VM2.

In addition, when the storage device enters the power down mode, the DMA manager 360 may perform the data backup operation DBO such that the DAM manager 360 reads the data stored in the buffer memory 330 to store the read data as the backup data BUDT in the nonvolatile memory device 220. Here, the storage controller may store the backup data BUDT in a single level cell (SLC) region of the nonvolatile memory device such that each memory cell in the SLC region stores one bit. In contrast, the data by the normal write operation may be stored in a multi-level cell (MLC) region of the nonvolatile memory device 220 such that each memory cell in the MLC region stores two or more bits. In general, the programming time and the bit error rate of the MLCs are greater than those of the SLCs. The time for the data backup operation DBO may be reduced and the occurrence of the uncorrectable error may be reduced by storing the backup data BUDT in the SLC region.

Referring to FIG. 11, when the storage device exits from the power down mode, the buffer context backup circuit 320 may perform the context restoring operation IRO such that the buffer context backup circuit 320 reads the backup information BUI from the second volatile memory VM2 to store or restore the buffer allocation information BAI in the first volatile memory VM1. In some embodiments, the backup information BUI may include the status information STI in addition to the buffer allocation information BAI. In this case, the buffer context backup circuit 320 may restore both of the buffer allocation information BAI and the status information STI from the backup information BUI, and store the buffer allocation information BAI and the status information STI in the first volatile memory VM1.

In addition, when the storage device exits from the power down mode, the DMA manager 360 may read the backup data BUDT from the nonvolatile memory device 220 to store or restore the read data in the buffer memory 330.

In some embodiments, when the storage device enters the power down mode, the compressor COMP may generate the backup information BUI by compressing the buffer allocation information BAI. In this case, the decompressor DECOMP may restore the buffer allocation information BAI by decompressing the backup information BUI when the storage device exits from the power down mode.

In some embodiments, when the storage device enters the power down mode, the ECC encoder ENC may generate encoded information by performing the ECC encoding of the buffer allocation information BAI and the compressor COMP may generate the backup information BUI by compressing the encoded information. In this case, the decompressor DECOMP may generate decompressed information by decompressing the backup information BUI and the ECC decoder DEC may restore the buffer allocation information BAI by performing the ECC decoding of the decompressed information.

In some embodiments, the compressor COMP and the decompressor DECOMP may operate based on a run-length encoding (RLE) algorithm. The RLE algorithm may be a compression algorithm that substitutes sequentially repeated characters or data units with one character and its length. The buffer allocation information BAI may include the allocation bitmap as the main data and thus the RLE algorithm may be efficiently applied to compress the buffer allocation information BAI. Embodiments are not limited to specific compression algorithms, and various algorithms may be used to reduce the size of the backup information BUI. As a result, the storage capacity of the second volatile memory VM2 may be smaller than the storage capacity of the first volatile memory VM1. As such, the size or the storage capacity of the second volatile memory VM2 storing the buffer allocation information BAI may be reduced or minimized and the power consumption of the power on domain including the second volatile memory VM2 may be reduced or minimized during the power down mode.

FIG. 10 illustrates timings of the context backup operation IBO and the data backup operation DBO.

Referring to FIG. 10, the data backup operation DBO may be performed during time interval T11~T14, and the context backup operation IBO may be performed during time interval T12~T13. The context backup operation IBO and the data backup operation DBO may be performed independently of each other by the buffer context backup circuit 320 and the DMA manager 360, respectively. In general, the write operation of the nonvolatile memory might take a longer time than the write operation of the volatile memory. Accordingly, as illustrated in FIG. 10, the buffer context backup circuit 320 may perform the context backup operation IBO while the storage device performs the data backup operation DBO. In other words, the context backup operation IBO according to an embodiment may be performed without increasing the time for entering the power down mode.

FIG. 12 illustrates comparative timings of a context rebuilding operation IRBLO followed by the data restoring operation DRO versus the context restoring operation IRO followed by the data restoring operation DRO.

Referring to FIG. 12, in the lower timeline of the present embodiment, the context restoring operation IRO may be performed during time interval T21~T22 and the data restoring operation DRO may be performed during time interval T22~T24. As such, after the context restoring operation IRO is completed, the storage device may perform the data restoring operation DRO based on the buffer allocation information BAI that is restored to the first volatile memory VM1 by the buffer context backup circuit 320.

According to the scheme as illustrated in the upper timeline of FIG. 12, the storage controller alternately performs a context rebuilding operation IRBLO to regenerate the status information STI and the buffer allocation information BAI again during time interval T21~T23, and performs the data restoring operation DRO based on the rebuilt buffer allocation information BAI during the time interval T23~T25. The context rebuilding operation IRBLO may be performed substantially as described with reference to FIGS. 4A through 7, and the context rebuilding operation IRBLO may take a relatively long time. According to an embodiment, the context rebuilding operation IRBLO that may take a relatively long time may be omitted and replaced with the context restoring operation IRO that may take a relatively short time. As a result, the time for exiting from the power down mode may be reduced.

Figure 13:
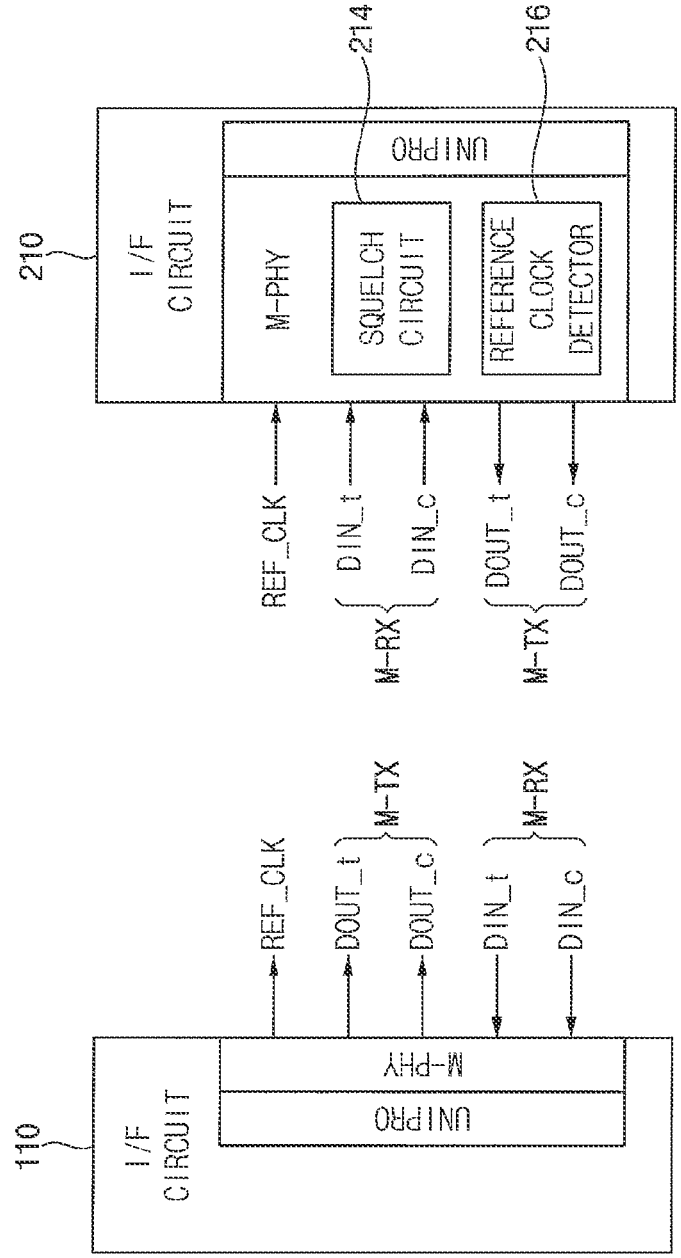
FIG. 13 is a block diagram illustrating an embodiment of interface circuits of a system including a storage device according to an embodiment.

FIG. 13 illustrates an embodiment of interface circuits for a system including a storage device according to an embodiment. FIG. 13 illustrates signals that are exchanged between the interface circuit 110 of the host device 100 and the interface circuit 210 of the storage device 200 as illustrated in FIG. 1.

The interface circuit 110 may conform to M-PHY and UNIPRO, which is the interface protocol proposed by the Mobile Industry Processor Interface (MIPI) alliance. For example, the interface circuit 110 may operate according to the UFS protocol, and a physical layer (M-PHY) of the interface circuit 110 may include output terminals DOUT_t and DOUT_c, input terminals DIN_t and DIN_c, and a clock terminal REF_CLK.

The M-PHY of the interface circuit 110 may transfer signals to the interface circuit 210 through the output terminals DOUT_t and DOUT_c. The output terminals DOUT_t and DOUT_c may constitute a transmit channel M-TX of the interface circuit 110. For example, the signals that are transferred through the output terminals DOUT_t and DOUT_c may be a pair of differential signals. That is, a signal that is transferred through the output terminal DOUT_c may be complementary to a signal that is transferred through the output terminal DOUT_t.

The M-PHY of the interface circuit 110 may receive signals from the interface circuit 210 through the input terminals DIN_t and DIN_c. The input terminals DIN_t and DIN_c may constitute a receive channel M-RX of the interface circuit 110. For example, the signals that are received through the input terminals DIN_t and DIN_c may be a pair of differential signals. That is, a signal that is received through the input terminal DIN_c may be complementary to a signal that is received through the input terminal DIN_t.

The output terminals DOUT_t and DOUT_c and the input terminals DIN_t and DIN_c may be controlled to one of various states in compliance with a given protocol. For example, each of the output terminals DOUT_t and DOUT_c and the input terminals DIN_t and DIN_c may be controlled to a positive state DIF-P, a negative state DIF-N, a ground state DIF-Z, or a floating state DIF-Q.

When a level (e.g., a voltage level) of an output signal of the first output terminal DOUT_t is higher than a level of an output signal of the second output terminal DOUT_c, the output terminals DOUT_t and DOUT_c may be at the positive state DIF-P. When the level of the output signal of the first output terminal DOUT_t is lower than the level of the output signal of the second output terminal DOUT_c, the output terminals DOUT_t and DOUT_c may be at the negative state DIF-N. When the first output terminal DOUT_t and the second output terminal DOUT_c are floated, the output terminals DOUT_t and DOUT_c may be at the floating state DIF-Q. When the levels of the first output terminal DOUT_t and the second output terminal DOUT_c are equal, the output terminals DOUT_t and DOUT_c may be at the ground state DIF-Z.

When a level of an input signal of the first input terminal DIN_t is higher than a level of an input signal of the second input terminal DIN_c, the input terminals DIN_t and DIN_c may be at the positive state DIF-P. When the level of the input signal of the first input terminal DIN_t is lower than the level of the input signal of the second input terminal DIN_c, the input terminals DIN_t and DIN_c may be at the negative state DIF-N. When the first input terminal DIN_t and the second input terminal DIN_c are connected with terminals of a ground state, the input terminals DIN_t and DIN_c may be at the ground state DIF-Z. When the first input terminal DIN_t and the second input terminal DIN_c are floated, the input terminals DIN_t and DIN_c may be at the floating state DIF-Q.

Also the interface circuit 210 may operate according to the UFS protocol, and a physical layer (M-PHY) of the interface circuit 110 may include output terminals DOUT_t and DOUT_c, input terminals DIN_t and DIN_c, and a clock terminal REF_CLK. The output terminals DOUT_t and DOUT_c of the interface circuit 210 may correspond to the input terminals DIN_t and DIN_c of the interface circuit 110, and the input terminals DIN_t and DIN_c of the interface circuit 210 may correspond to the output terminals DOUT_t and DOUT_c of the interface circuit 110.

The M-PHY of the interface circuit 210 may receive signals through the input terminals DIN_t and DIN_c and may transfer signals through the output terminals DOUT_t and DOUT_c. As in the above description given with reference to the interface circuit 110, the output terminals DOUT_t and DOUT_c and the input terminals DIN_t and DIN_c of the interface circuit 210 may be controlled to the positive state DIF-P, the negative state DIF-N, the ground state DIF-Z, or the floating state DIF-Q.

Meanwhile, according to the MIPI M-PHY specification, the M-PHY of the interface circuit 210 may be configured to detect levels of the input terminals DIN_t and DIN_c. In an embodiment, the M-PHY may include a squelch circuit 214 for detecting levels of the input terminals DIN_t and DIN_c as a way to detect levels of terminals. In addition, the M-PHY may further include a reference clock detector 216. The squelch circuit 214 and/or the reference clock detector 216 may detect a change between the idle mode and the active mode of the storage device.

When the storage device (e.g., the storage device 200 in FIG. 1) does not execute any operation, the storage device may be in a first idle mode or a second idle mode. When the storage device is in the first idle mode or the second idle mode, the interface circuit 110 need not transfer the reference clock REF_CLK to the interface circuit 210. When the storage device switches from the first idle mode and/or the second idle mode to the active mode, the input terminals DIN_t and DIN_c of the interface circuit 210 may switch from the floating state DIF-Q to the negative state DIF-N. When the storage device switches from the first idle mode and/or the second idle mode to the active mode, the interface circuit 110 may resume a transfer of the reference clock REF_CLK to the interface circuit 210.

In an embodiment, when the storage device is in the first idle mode, the squelch circuit 214 may be in an active state (e.g., in a state where a power supply voltage is supplied thereto). Accordingly, when the storage device switches from the first idle mode to the active mode, the squelch circuit 214 may detect that the input terminals DIN_t and DIN_c of the interface circuit 210 switch from the floating state DIF-Q to the negative state DIF-N. The squelch circuit 214 may generate a trigger signal for allowing the storage device to enter the active mode, based on a result of the detection.

In an embodiment, when the storage device is in the second idle mode, the squelch circuit 214 may be in an inactive state (e.g., in a state where a power supply voltage is not supplied thereto). Instead, the reference clock detector 216 may generate the trigger signal for allowing the storage device to enter the active mode, based on toggling of the reference clock REF_CLK.

In general, to detect a switch of the input terminals DIN_t and DIN_c from the floating state DIF-Q to the negative state DIF-N may exhibit a power consumption greater than the power consumption utilized to detect toggling of a clock. Accordingly, the power consumption of the reference clock detector 216 may be smaller than the power consumption of the squelch circuit 214. In other words, the power consumption of the storage device in the second idle mode may be smaller than the power consumption of the storage device in the first idle mode.

Figure 14:
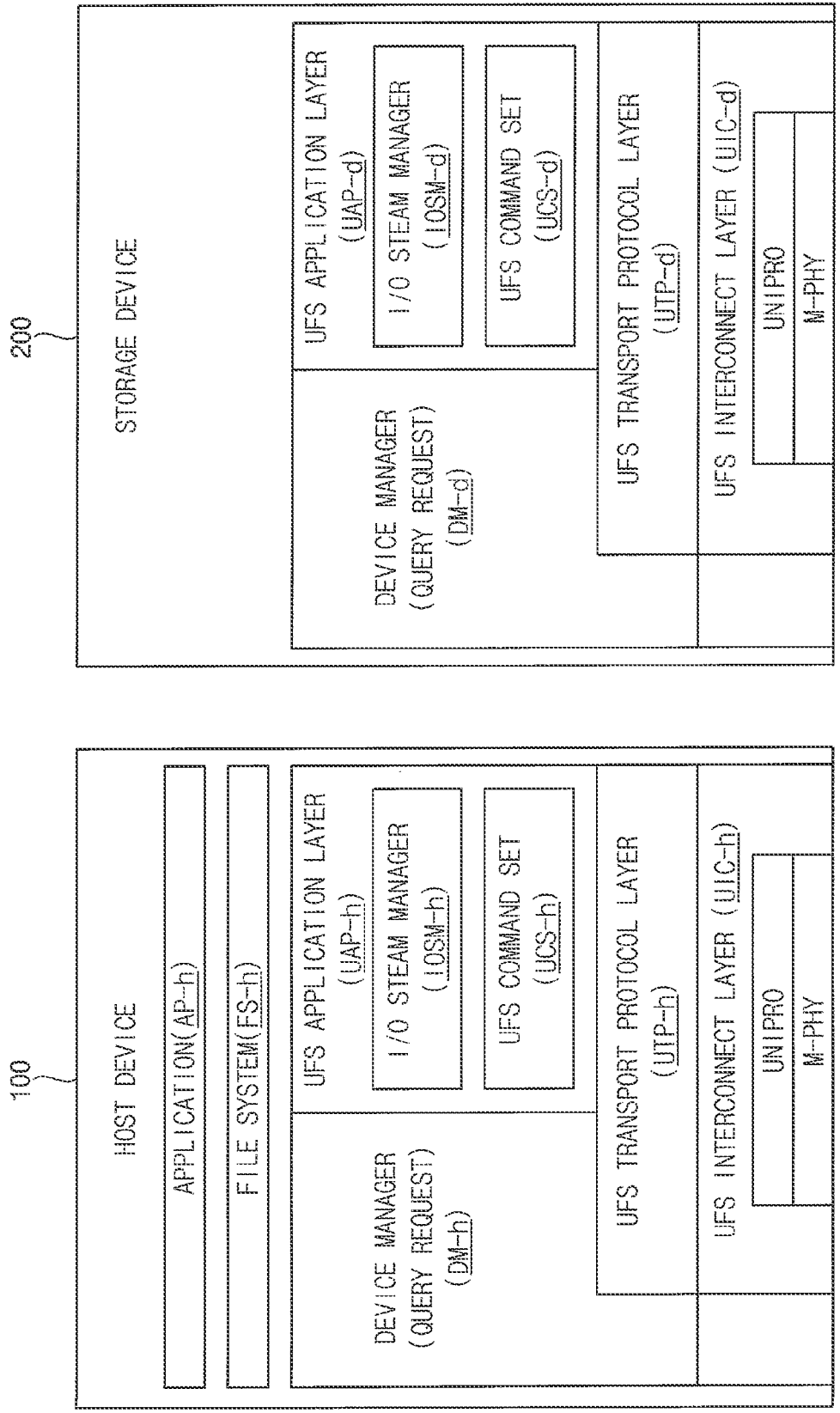
FIG. 14 is a block diagram illustrating a hierarchical structure according to an interface protocol of a system including a storage device according to an embodiment.

FIG. 14 illustrates a hierarchical structure according to an interface protocol of a system including a storage device according to an embodiment.

Referring to FIGS. 1, 13 and 14, the host device 100 may include physical hardware circuits and/or a program code executable by a processor for performing unique functions of an application AP-h, a file system FS-h, a device manager DM-h, a UFS application layer UAP-h, a UFS transport protocol layer UTP-h, and a UFS interconnect layer UIC-h.

The application AP-h may include various application programs, processes, or the like. that are driven on the host device 100. The application AP-h that is an upper layer may handle a request from a user of the system. The application AP-h may handle normal commands such as a read command and a write command. The application AP-h may provide a control of a device level such as a query request.

The file system FS-h may organize and manage a variety of data (files) generated by the application AP-h. The file system FS-h may generate a logical address corresponding to an access request (e.g., a write request or the like) to the storage device 200. For example, the file system FS-h may include FAT (File Allocation Table), FAT32, NTFS (NT File System), HFS (Hierarchical File System), JSF2 (Journaled File System2), XFS, ODS-5 (On-Disk Structure-5), UDF, ZFS, UFS (Unix File System), ext2, ext3, ext4, ReiserFS, Reiser4, ISO 9660, Gnome VFS, BFS, WinFS, or the like The UFS application layer UAP-h is configured to support various commands between the host device 100 and the storage device 200. For example, the UFS application layer UAP-h may include an input/output (I/O) stream manager IOSM-h and a UFS command set UCS-h. The I/O stream manager IOSM-h is configured to manage a request from the application AP-h or the file system FS-h.

In an embodiment, the I/O stream manager IOSM-h may be configured to identify a specific value of an input/output from the application AP-h or the file system FS-h. The I/O stream manager IOSM-h may be configured to manage a priority of a request from the application AP-h or the file system FS-h or to support various functions corresponding to the request from the application AP-h or the file system FS-h.

The UFS command set UCS-h may support various command sets that are supported between the host device 100 and the storage device 200. For example, the UFS command set UCS-h may include a UFS native command set and a UFS SCSI command set. The UFS command set UCS-h may configure a command to be transferred to the storage device 200 depending on a request from the application AP-h or the file system FS-h.

The UFS application layer UAP-h may further include a task manager that processes commands for a control of a command queue.

The device manager DM-h may manage operations of a device level and configurations of a device level. For example, the device manager DM-h may manage a query request for setting or checking a variety of information.

The UFS transport protocol layer UTP-h may provide services for an upper layer. The UFS transport protocol layer UTP-h may generate a command or information provided from the UFS application layer UAP-h, or a query request provided from the device manager DM-h in the form of a UPIU (UFS Protocol Information Unit) packet.

In an embodiment, the UFS transport protocol layer UTP-h and the device manager DM-h may communicate with each other through a UDM-SAP (UDM-Service Access Point). The UFS transport protocol layer UTP-h and the UFS application layer UAP-h may communicate with each other through a UTP_CMD_SAP or a UTP_TM_SAP.

The UFS interconnect layer UIC-h may manage a connection with the storage device 200 where the UFS Interconnect layer UIC-h of the host 100 and the UFS Interconnect layer UIC-d of the storage device 200 may communicate over a physical layer. The UFS interconnect layer UIC-h may include hardware components, which are physically connected with a UFS interconnect layer UIC-d of the storage device 200, such as an MIPI Unipro and an MIPI M-PHY. The UFS interconnect layer UIC-h and the UFS transport protocol layer UTP-h may communicate with each other through a UIC-SAP, and the UFS interconnect layer UIC-h and the device manager DM-h may communicate with each other through a UIO-SAP.

The host device 100 may further include a device driver. The device driver may control a device and/or a layer included in the host device 100. The device driver may convert a request (e.g., a write request or the like) for the storage device 200 generated by the file system FS-h to a command capable of being identified by the storage device 200. For example, the file system FS-h and the device driver may be included in an operating system (OS), and the application AP-h may be installed in the OS. The device driver may control a communication with the storage device 200 while managing a hardware resource.

The storage device 200 may include physical hardware circuits and/or a program code executable by a processor for performing unique function(s) of a device manager DM-d, a UFS application layer UAP-d, a UFS transport protocol layer UTP-d, and the UFS interconnect layer UIC-d. A configuration of the UFS application layer UAP-d, the UFS transport protocol layer UTP-d, and the UFS interconnect layer UIC-d may be understood as a configuration that is similar to that of the UFS application layer UAP-h, the UFS transport protocol layer UTP-h, and the UFS interconnect layer UIC-h of the host device 100 and performs a logical communication between corresponding layers, and thus, additional description will be omitted to avoid redundancy.

However, unlike the physical layer M-PHY of the UFS interconnect layer UIC-h, the physical layer M-PHY of the UFS interconnect layer UIC-d may monitor the reference clock REF_CLK received from the host device 100. When a monitoring result indicates that an input of the reference clock REF_CLK is suspended in the active mode of the storage device 200, a power supply voltage that is provided to at least some components (in particular, the squelch circuit 214 in FIG. 13) of the storage device 200 may be blocked. When the monitoring result indicates that an input of the reference clock REF_CLK is detected in the idle mode of the storage device 200, the supply of a power supply voltage to components of the storage device 200 may be resumed.

Meanwhile, the above hierarchical structure and function of each of the host device 100 and the storage device 200 are examples and are to help understanding of the present disclosure. Accordingly, embodiments of the present disclosure are not limited thereto.

Figure 15:
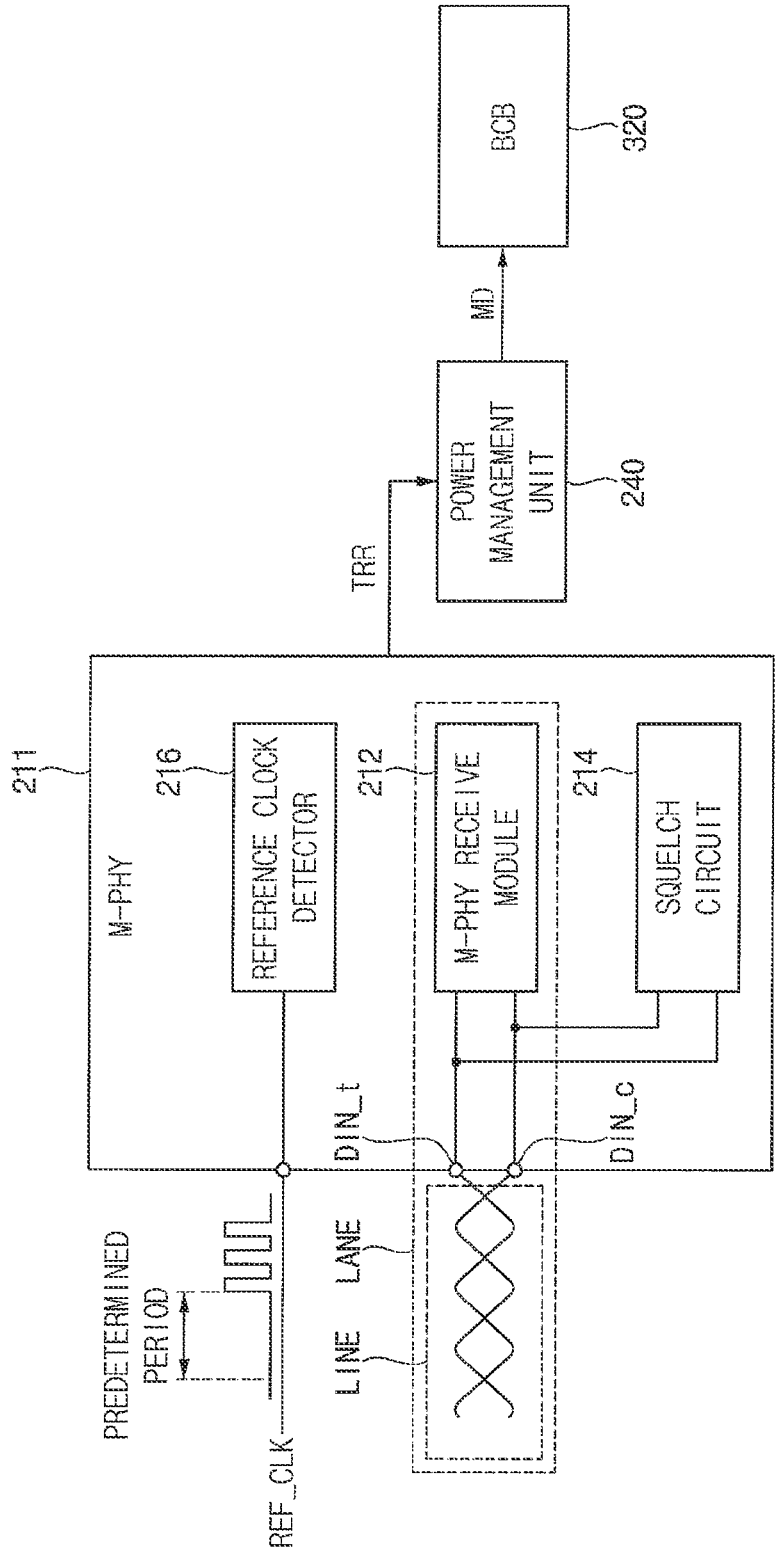
FIG. 15 is a hybrid diagram illustrating a storage device according to an embodiment.

FIG. 15 illustrates a storage device according to an embodiment. For example, FIG. 15 conceptually illustrates how an interface circuit enters the power down mode (e.g., the hibernation mode or the hibernate state HIBERN8 specified by the UFS standard) from the active mode, and how the interface circuit exits from the power down mode to the active mode.

The storage device 200 may include the physical layer (M-PHY) 211, the power management unit 240 and the buffer context backup circuit BCB 320. The physical layer 211 may include an M-PHY receive module 212, the squelch circuit 214, and the reference clock detector 216. For example, the physical layer 211 may be included in the interface circuit 210 of FIGS. 1 and 13. The M-PHY receive module 212 may include a circuit (e.g., an analog front end) for processing a signal received from the host device. The M-PHY receive module 212 may be connected with a line "LINE" through the input terminals DIN_t and DIN_c. The line "LINE", the input terminals DIN_t and DIN_c, and the M-PHY receive module 212 may be referred to as a lane "LANE".

In the case where the reference clock REF_CLK is not received during a given time or a predetermined period, the interface circuit 110 (see FIG. 13) of the host device may have already entered the hibernate state HIBERN8. In this case, the reference clock detector 216 may generate a trigger signal TRR for allowing the interface circuit 210 to enter the hibernate state HIBERN8 and may transfer the trigger signal TRR to the power management unit 240.

The squelch circuit 214 need not operate while the interface circuit 210 is in the hibernate state HIBERN8. Instead, the reference clock detector 216 may detect whether the reference clock REF_CLK is received. The reference clock detector 216 detects an edge of the reference clock REF_CLK and generates the trigger signal TRR for allowing the storage device to enter the active mode, based on a result of the detection. The physical layer 211 may transfer the trigger signal TRR to the power management unit 240.

The power management unit 240 may control powers supplied to the components in the storage device, based on the trigger signal TRR. As described with reference to FIG. 9, the power management unit 240 may block the first power PW1 supplied to the power off domain and maintain the second power PW2 supplied to the power on domain during the power down mode, that is, in the hibernate state HIBERN8.

The power management unit 240 may generate an internal mode signal MD indicating start and end of the power down mode, based on the trigger signal TRR. The mode detector MDET of the buffer context backup circuit 320 as illustrated in FIGS. 9 and 11 may receive the internal mode signal MD from the power management unit 240. The mode detector MDET may determine timings of starting the context backup operation IBO and the context restoring operation IRO based on the internal mode signal MD.

Figure 16:
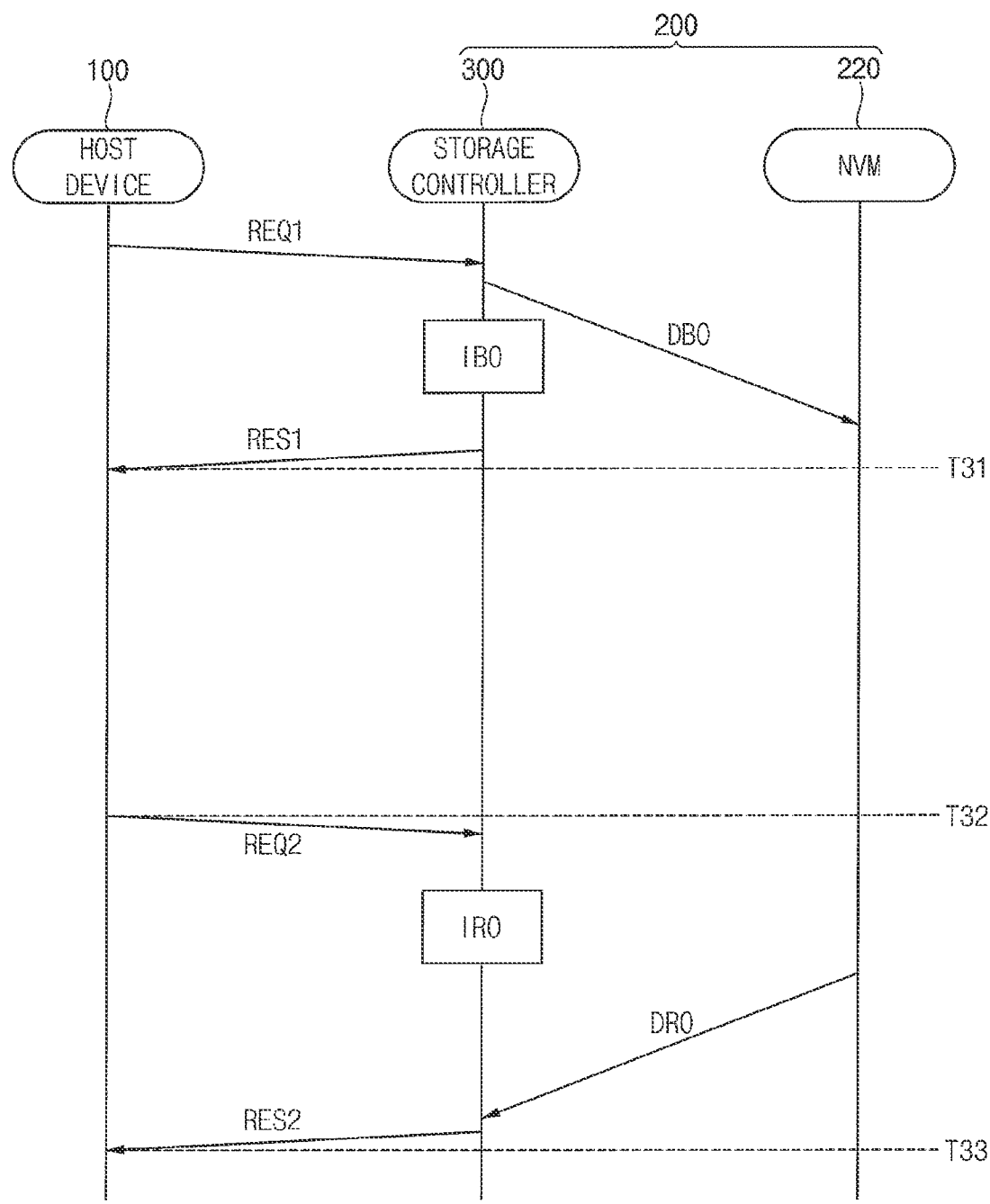
FIG. 16 is a flowchart diagram illustrating an operation of a storage device according to an embodiment.

FIG. 16 illustrates an operation of a storage device according to an embodiment.

Referring to FIG. 16, when the host device 100 does not execute any operation, the host device 100 may transmit a power down enter request REQ1 to the storage device 200. In some embodiments, the storage device 200 may communicate with the host device 100 according to the UFS standard, and the power down mode may be a hibernation mode (e.g., the hibernate state HIBERN8) according to the UFS standard.

The storage device 200 may perform the data backup operation DBO in response to the power down enter request REQ1. In addition, the storage device 200 may perform the context backup operation IBO using the buffer context backup circuit 320 in parallel with the data backup operation DBO. As described with reference to FIG. 10, the buffer context backup circuit 320 may perform the context backup operation IBO while the storage device 200 performs the data backup operation DBO.

When the storage device 200 is ready to enter the power down mode, the storage device 200 may transmit a response RES1 to the host device 100, and the host device 100 and the storage device 200 may enter the power down mode at time point T31.

After that, the host device 100 may enter the active mode at time point T32, and the host device 100 may transmit a power down exit request REQ2 to the host device 200. Here, as described with reference to FIG. 13, the host device 100 may transfer the reference clock REF_CLK to the storage device 200, and the reference clock detector 216 may detect the reference clock REF_CLK. The reference clock detector 216 may generate the trigger signal TRR based on the detection result, the power management unit 240 may generate the internal mode signal MD based on the trigger signal TRR, and the buffer context backup circuit 320 may start the context restoring operation IRO based on the internal mode signal MD. In addition, the storage device 200 may perform the data restoring operation DRO referring to the buffer allocation information BAI that is restored to the first volatile memory VM1 by the context restoring operation IRO.

When the storage device 200 is ready to exit from the power down mode, the storage device 200 may transmit a response RES2 to the host device 100, and the host device 100 and the storage device 200 may enter the active mode from power down mode at time point T33.

Figure 17:
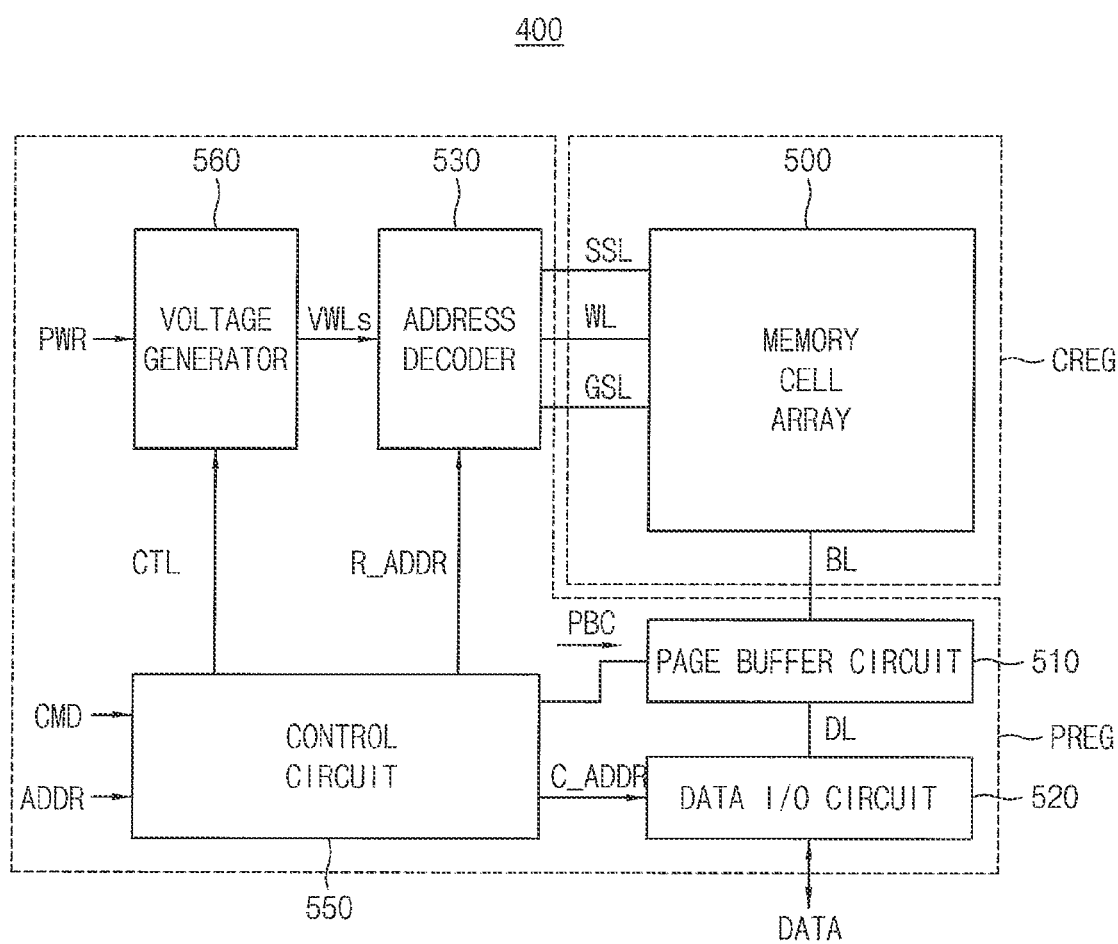
FIG. 17 is a block diagram illustrating a nonvolatile memory device included in a storage device according to an embodiment.

FIG. 17 illustrates a nonvolatile memory device included in a storage device according to an embodiment.

Referring to FIG. 17, a nonvolatile memory device 400 may include a memory cell array 500, a page buffer circuit 510, a data input/output (I/O) circuit 520, an address decoder 530, a control circuit 550 and a voltage generator 560. The memory cell array 500 may be disposed in a cell region CREG, and the page buffer circuit 510, the data I/O circuit 520, the address decoder 530, the control circuit 550 and the voltage generator 560 may be disposed in a peripheral region PREG.

The memory cell array 500 may be coupled to the address decoder 530 through string selection lines SSL, wordlines WL, and ground selection lines GSL. In addition, the memory cell array 500 may be coupled to the page buffer circuit 510 through a bitlines BL. The memory cell array 500 may include a memory cells coupled to the wordlines WL and the bitlines BL. In some embodiments, the memory cell array 500 may be a three-dimensional memory cell array, which is formed on a substrate in a three-dimensional structure (for example, a vertical structure). In this case, the memory cell array 500 may include cell strings (e.g., NAND strings) that are vertically oriented such that at least one memory cell is overlapped vertically with another memory cell.

The control circuit 550 may receive a command (signal) CMD and an address (signal) ADDR from a memory controller. Accordingly, the control circuit 550 may control erase, program and read operations of the nonvolatile memory device 400 in response to (or based on) at least one of the command signal CMD and the address signal ADDR. An erase operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recover read operation.

For example, the control circuit 550 may generate the control signals CTL used to control the operation of the voltage generator 560, and may generate the page buffer control signal PBC for controlling the page buffer circuit 510 based on the command signal CMD, and generate the row address R_ADDR and the column address C_ADDR based on the address signal ADDR. The control circuit 550 may provide the row address R_ADDR to the address decoder 530 and provide the column address C_ADDR to the data I/O circuit 520.

The address decoder 530 may be coupled to the memory cell array 500 through the string selection lines SSL, the wordlines WL, and the ground selection lines GSL. During the program operation or the read operation, the address decoder 530 may determine or select one of the wordlines WL as a selected wordline and determine the remaining wordlines WL except for the selected wordline as unselected wordlines based on the row address R_ADDR.

During the program operation or the read operation, the address decoder 530 may determine one of the string selection lines SSL as a selected string selection line and determine rest of the string selection lines SSL except for the selected string selection line as unselected string selection lines based on the row address R_ADDR.

The voltage generator 560 may generate wordline voltages VWL, which are required for the operation of the memory cell array 500 of the nonvolatile memory device 400, based on the control signals CTL. The voltage generator 560 may receive power PWR from the memory controller. The wordline voltages VWL may be applied to the wordlines WL through the address decoder 530.

For example, during the erase operation, the voltage generator 560 may apply an erase voltage to a well and/or a common source line of a memory block and apply an erase permission voltage (e.g., a ground voltage) to at least some of the wordlines of the memory block based on an erase address. During the erase verification operation, the voltage generator 560 may apply an erase verification voltage simultaneously to all of the wordlines of the memory block or sequentially (e.g., one by one) to the wordlines.

For example, during the program operation, the voltage generator 560 may apply a program voltage to the selected wordline and may apply a program pass voltage to the unselected wordlines. In addition, during the program verification operation, the voltage generator 560 may apply a program verification voltage to the first wordline and may apply a verification pass voltage to the unselected wordlines.

During the normal read operation, the voltage generator 560 may apply a read voltage to the selected wordline and may apply a read pass voltage to the unselected wordlines.

During the data recover read operation, the voltage generator 560 may apply the read voltage to a wordline adjacent to the selected wordline and may apply a recover read voltage to the selected wordline.

The page buffer circuit 510 may be coupled to the memory cell array 500 through the bitlines BL. The page buffer circuit 510 may include multiple buffers. In some embodiments, each buffer may be connected to a single bitline. In other embodiments, each buffer may be connected to two or more bitlines. The page buffer circuit 510 may temporarily store data to be programmed in a selected page or data read out from the selected page of the memory cell array 500.

The data I/O circuit 520 may be coupled to the page buffer circuit 510 through data lines DL. During the program operation, the data I/O circuit 520 may receive program data DATA received from the memory controller and provide the program data DATA to the page buffer circuit 510 based on the column address C_ADDR received from the control circuit 550. During the read operation, the data I/O circuit 520 may provide read data DATA, having been read from the memory cell array 500 and stored in the page buffer circuit 510, to the memory controller based on the column address C_ADDR received from the control circuit 550.

In addition, the page buffer circuit 510 and the data I/O circuit 520 may read data from a first area of the memory cell array 500 and write the read data to a second area of the memory cell array 500 (e.g., without transmitting the data to a source external to the nonvolatile memory device 400, such as to the memory controller). For example, the page buffer circuit 510 and the data I/O circuit 520 may perform a copy-back operation.

Figure 18:
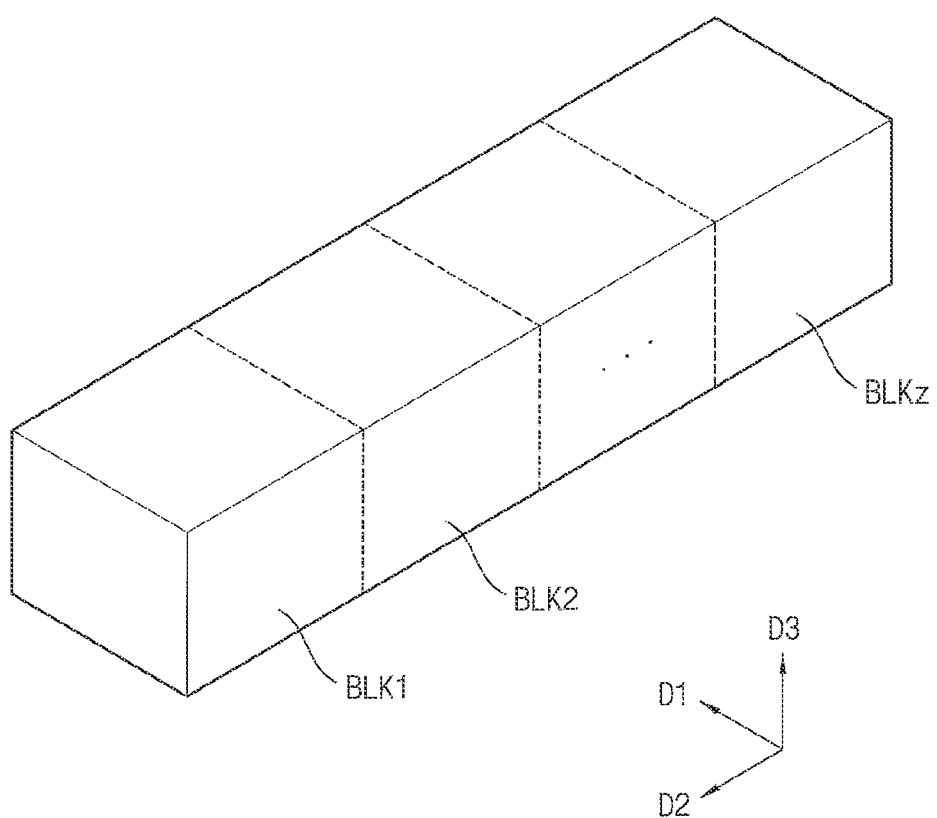
FIG. 18 is a block diagram illustrating a memory cell array included in the nonvolatile memory device of FIG. 17.
Figure 19:
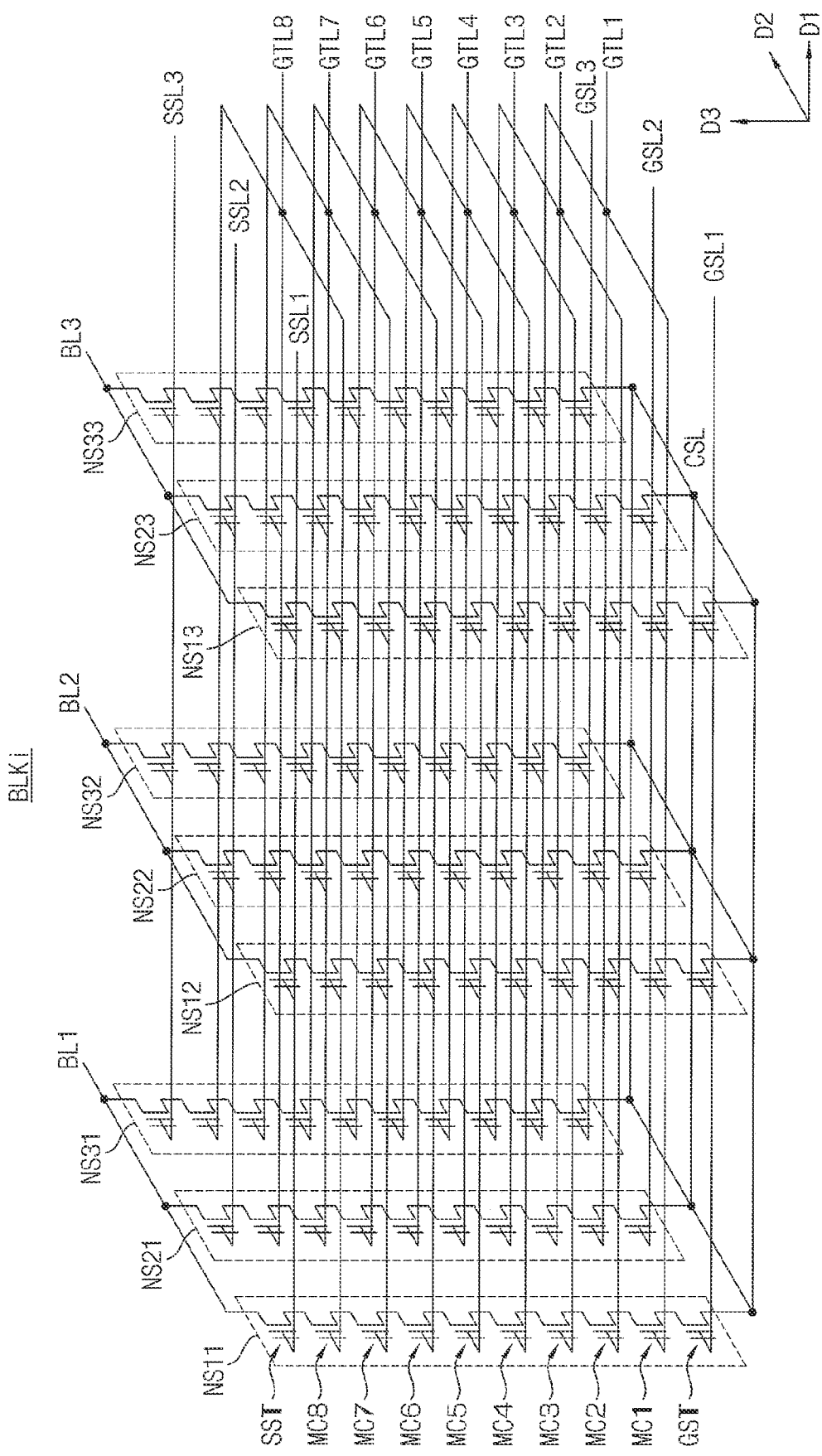
FIG. 19 is a circuit diagram illustrating an equivalent circuit of a memory block included in the memory cell array of FIG. 18.

FIG. 18 illustrates a memory cell array included in the nonvolatile memory device of FIG. 17, and FIG. 19 illustrates an equivalent circuit of a memory block included in the memory cell array of FIG. 18.

Referring to FIG. 18, the memory cell array 500 may include memory blocks BLK1 to BLKz. In some embodiments, the memory blocks BLK1 to BLKz may be selected by the address decoder 430 of FIG. 17. For example, the address decoder 430 may select a particular memory block BLK among the memory blocks BLK1 to BLKz corresponding to a block address.

The memory block BLKi of FIG. 19 may be formed on a substrate in a three-dimensional structure (for example, a vertical structure). For example, NAND strings or cell strings included in the memory block BLKi may be disposed in the vertical direction D3 perpendicular to the upper surface of the substrate.

Referring to FIG. 19, the memory block BLKi may include NAND strings NS11 to NS33 coupled between bitlines BL1, BL2 and BL3 and a common source line CSL. Each of the NAND strings NS11 to NS33 may include a string selection transistor SST, a memory cells MC1 to MC8, and a ground selection transistor GST. In FIG. 19, each of the NAND strings NS11 to NS33 is illustrated to include eight memory cells MC1 to MC8. However, embodiments are not limited thereto. In some embodiments, each of the NAND strings NS11 to NS33 may include any number of memory cells.

Each string selection transistor SST may be connected to a corresponding string selection line (for example, one of SSL1 to SSL3). The memory cells MC1 to MC8 may be connected to corresponding gate lines GTL1 to GTL8, respectively. The gate lines GTL1 to GTL8 may be wordlines, and some of the gate lines GTL1 to GTL8 may be dummy wordlines. Each ground selection transistor GST may be connected to a corresponding ground selection line (for example, one of GSL1 to GSL3). Each string selection transistor SST may be connected to a corresponding bitline (e.g., one of BL1, BL2 and BL3), and each ground selection transistor GST may be connected to the common source line CSL.

Wordlines (e.g., the gate line GTL1) having the same height may be commonly connected, and the ground selection lines GSL1 to GSL3 and the string selection lines SSL1 to SSL3 may be separated. In FIG. 19, the memory block BLKi is illustrated to be coupled to eight gate lines GTL1 to GTL8 and three bitlines BL1 to BL3. However, embodiments are not limited thereto. Each memory block in the memory cell array 500 may be coupled to any number of wordlines and any number of bitlines.

As described above, the storage device and the method according to an embodiment may reduce the power down exit time and enhance the performance of the storage device by omitting a process of reconstructing the buffer allocation information that is required while exiting from the power down mode. In addition, the storage device and the method according to an embodiment may enhance the performance of the storage device with reduction of the size of the second volatile memory and the static power consumption of the power on domain by compressing the buffer allocation information to back up the compressed information in the second volatile memory during the power down mode.

The embodiments may be applied to any electronic devices and systems including a storage device. For example, the inventive concept may be applied to systems such as a memory card, a solid state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a server system, an automotive driving system, or the like The foregoing is illustrative of descriptive embodiments and is not to be construed as limiting thereof. Although embodiments have been described, those of ordinary skill in the pertinent art will readily appreciate that many modifications are possible in the described and other embodiments without materially departing from the present inventive concept as set forth in the claims.

What is claimed is:

1. A storage device comprising:
a nonvolatile memory device; and
a storage controller configured to control operations of the nonvolatile memory device, the storage controller comprising:
  a buffer memory configured to temporarily store read data read from the nonvolatile memory device and write data to be written in the nonvolatile memory device;
  a first volatile memory and a second volatile memory included in different power domains;
  a processor configured to generate buffer allocation information on storage regions of the buffer memory and data stored in the storage regions, store the buffer allocation information in the first volatile memory, and control an access to the buffer memory based on the buffer allocation information; and a buffer context backup circuit configured to perform a context backup operation to read the buffer allocation information from the first volatile memory and store backup information in the second volatile memory when the storage device enters a power down mode, and to perform a context restoring operation to read the backup information from the second volatile memory and store the buffer allocation information in the first volatile memory when the storage device exits from the power down mode, wherein the first volatile memory is included in the processor or the first volatile memory is a tightly coupled memory that is directly connected to the processor without passing through a system bus of the storage device, wherein the second volatile memory is directly connected to the buffer context backup circuit without passing through the system bus.

2. The storage device of claim 1, wherein the buffer memory, the first volatile memory and the processor are included in a power off domain such that power supplied to the power off domain is blocked during the power down mode, and the second volatile memory is included in a power on domain such that power is supplied to the power on domain during the power down mode.

3. The storage device of claim 1, wherein the buffer context backup circuit is configured to generate the backup information by compressing the buffer allocation information when the storage device enters the power down mode, and restore the buffer allocation information by decompressing the backup information when the storage device exits from the power down mode.

4. The storage device of claim 1, wherein the buffer context backup circuit is configured to generate encoded information by error correction code (ECC) encoding of the buffer allocation information and generate the backup information by compressing the encoded information when the storage device enters the power down mode, and generate decompressed information by decompressing the backup information and restore the buffer allocation information by performing ECC decoding of the decompressed information when the storage device exits from the power down mode.

5. The storage device of claim 1, wherein:
the first volatile memory is a dynamic random-access memory (DRAM),
the second volatile memory is a static random-access memory (SRAM), and
a storage capacity of the second volatile memory is smaller than a storage capacity of the first volatile memory.

6. The storage device of claim 1, wherein the storage controller is configured to communicate with a host device according to a universal flash storage (UFS) standard, and the power down mode is a hibernation mode according to the UFS standard.

7. The storage device of claim 1, wherein the storage controller further comprises a power management unit configured to manage power in the storage device, and the buffer context backup circuit is configured to determine timings of starting the context backup operation and the context restoring operation based on an internal mode signal that is provided from the power management unit.

8. The storage device of claim 7, wherein the power management unit is configured to block power from being supplied to the buffer memory, the first volatile memory, the processor and the buffer context backup circuit during the power down mode, and supply power to the second volatile memory during the power down mode.

9. The storage device of claim 1, wherein the storage controller is connected to the nonvolatile memory device through a plurality of channels and the storage controller is configured to generate status information per channel based on respective workloads of the plurality of channels and store the status information in the first volatile memory.

10. The storage device of claim 9, wherein the buffer context backup circuit is configured to read the status information from the first volatile memory and store the status information as a portion of the backup information in the second volatile memory during the context backup operation, and store the states information in the first volatile memory based on the backup information during the context restoring operation.

11. The storage device of claim 1,
wherein the first volatile memory is included in a power off domain such that power supplied to the power off domain is blocked during a power down mode,
wherein the second volatile memory is included in a power on domain such that power is supplied to the power on domain during the power down mode,
wherein the buffer context backup circuit is further configured to compress the buffer allocation information before storing the backup information in the second volatile memory when the storage device enters the power down mode, and to decompress the backup information before storing the buffer allocation information in the first volatile memory when the storage device exits from the power down mode.

12. The storage device of claim 11, wherein the storage controller is configured to communicate with a host device according to a universal flash storage (UFS) standard, and the power down mode is a hibernation mode according to the UFS standard.

13. A storage device comprising:
a nonvolatile memory device; and
a storage controller configured to control operations of the nonvolatile memory device, the storage controller comprising:
a buffer memory configured to temporarily store read data read from the nonvolatile memory device and write data to be written in the nonvolatile memory device;
a first volatile memory and a second volatile memory included in different power domains;
a processor configured to generate buffer allocation information on storage regions of the buffer memory and data stored in the storage regions, store the buffer allocation information in the first volatile memory, and control an access to the buffer memory based on the buffer allocation information; and
a buffer context backup circuit configured to perform a context backup operation to read the buffer allocation information from the first volatile memory and store backup information in the second volatile memory when the storage device enters a power down mode, and to perform a context restoring operation to read the backup information from the second volatile memory and store the buffer allocation information in the first volatile memory when the storage device exits from the power down mode,
wherein the storage controller is configured to perform a data backup operation to read data from the buffer memory and store backup data in the nonvolatile memory device when the storage device enters the power down mode.

14. The storage device of claim 13, wherein the buffer context backup circuit is configured to perform the context backup operation while the storage controller performs the data backup operation.

15. The storage device of claim 13, wherein the storage controller is configured to store the backup data in a single level cell (SLC) region of the nonvolatile memory device such that each memory cell in the SLC region stores one bit.

16. The storage device of claim 13, wherein the storage controller is configured to perform a data restoring operation to read the backup data and store the backup data in the buffer memory when the storage device exits from the power down mode.

17. The storage device of claim 16, wherein the storage controller is configured to, after the context restoring operation is completed, perform the data restoring operation based on the buffer allocation information that is restored to the first volatile memory by the buffer context backup circuit.

18. A method of operating a storage device, comprising:
generating buffer allocation information on storage regions of a buffer memory and data stored in the storage regions;
storing the buffer allocation information in a first volatile memory;
controlling an access to the buffer memory based on the buffer allocation information;
performing a context backup operation to read the buffer allocation information from the first volatile memory and store backup information in a second volatile memory when the storage device enter a power down mode;
performing a context restoring operation to read the backup information from the second volatile memory and store the buffer allocation information in the first volatile memory when the storage device exits from the power down mode; and
performing a data backup operation to read data from the buffer memory and store backup data in a nonvolatile memory when the storage device enters the power down mode.

19. The storage device of claim 13, wherein the first volatile memory is included in the processor or the first volatile memory is a tightly coupled memory that is directly connected to the processor without passing through a system bus of the storage device.

20. The storage device of claim 19, wherein the second volatile memory is directly connected to the buffer context backup circuit without passing through the system bus.

* * * * *